US011951514B2

(12) United States Patent
Stakutis et al.

(10) Patent No.: US 11,951,514 B2
(45) Date of Patent: Apr. 9, 2024

(54) CONTROLLING A FUME HOOD AIRFLOW USING AN IMAGE OF A FUME HOOD OPENING

(71) Applicant: Honeywell International Inc., Morris Plains, NJ (US)

(72) Inventors: Richard E. Stakutis, Sundbury, MA (US); David Boisvert, North Chelmsford, MA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 749 days.

(21) Appl. No.: 16/843,765

(22) Filed: Apr. 8, 2020

(65) Prior Publication Data

US 2020/0230671 A1 Jul. 23, 2020

Related U.S. Application Data

(63) Continuation of application No. 15/587,252, filed on May 4, 2017, now abandoned, which is a continuation (Continued)

(51) Int. Cl.
*B08B 15/02* (2006.01)
*F24F 3/163* (2021.01)

(52) U.S. Cl.
CPC ............ *B08B 15/023* (2013.01); *F24F 3/163* (2021.01)

(58) Field of Classification Search
CPC . B08B 15/023; F24F 3/163; F24F 7/06; F24F 11/89

(Continued)

(56) References Cited

U.S. PATENT DOCUMENTS 4,528,898 A 7/1985 Sharp et al.
4,706,553 A 11/1987 Sharp et al.

(Continued)

FOREIGN PATENT DOCUMENTS

AU 63730/90 B 12/1991
DE 10028333 A1 12/2001

(Continued)

OTHER PUBLICATIONS

GB1507133.5 Examination Report under Section 18(3), dated Jun. 28, 2018.

(Continued)

*Primary Examiner* — Steven B McAllister
*Assistant Examiner* — Charles R Brawner
(74) *Attorney, Agent, or Firm* — Seager, Tufte & Wickhem, LLP

(57) ABSTRACT

The present disclosure relates generally to fume hoods, and more particularly to systems and methods for controlling a fume hood airflow using an image (e.g., an optical image, an acoustic image, etc.) of a fume hood opening. A system for controlling a fume hood may include an image capture sensor, a configurator and a controller. The image capture sensor may be positioned to have a field of view that includes at least a portion of a fume hood opening, and may be configured to capture an image that includes at least part of the fume hood opening and/or a person working at the hood. The controller may then provide a control signal to a ventilation device for providing a desired airflow in the fume hood. The control signal may depending on the current size of the fume hood opening as captured by the image capture sensor.

20 Claims, 18 Drawing Sheets

Related U.S. Application Data of application No. 13/665,446, filed on Oct. 31, 2012, now Pat. No. 9,694,398.

(58) Field of Classification Search
USPC .......................................................... 454/239
See application file for complete search history.

(56) References Cited

U.S. PATENT DOCUMENTS

| | | | | |
|---|---|---|---|---|
| 4,893,551 | A | 1/1990 | Sharp et al. | |
| 4,934,256 | A | 6/1990 | Moss et al. | |
| 5,092,227 | A | 3/1992 | Ahmed et al. | |
| 5,115,728 | A | 5/1992 | Ahmed et al. | |
| 5,117,746 | A | 6/1992 | Sharp | |
| 5,170,673 | A | 12/1992 | Ahmed et al. | |
| 5,215,497 | A | 6/1993 | Drees | |
| 5,240,455 | A | 8/1993 | Sharp | |
| 5,385,505 | A | 1/1995 | Sharp et al. | |
| 5,439,414 | A | 8/1995 | Jacob | |
| 5,562,537 | A | 10/1996 | Zver et al. | |
| 5,733,188 | A | 3/1998 | Jacob | |
| 5,882,254 | A * | 3/1999 | Jacob | B08B 15/023 454/56 |
| 6,137,403 | A | 10/2000 | Desrochers et al. | |
| 6,252,689 | B1 | 6/2001 | Sharp | |
| 6,587,067 | B2 | 7/2003 | Darbee | |
| 6,739,967 | B2 | 5/2004 | Saito et al. | |
| 6,935,943 | B2 | 8/2005 | Desai | |
| 6,960,126 | B2 | 11/2005 | Desai | |
| 6,994,619 | B2 | 2/2006 | Scholten | |
| 7,532,541 | B2 | 5/2009 | Govindswamy et al. | |
| 7,994,480 | B2 | 8/2011 | Johnson et al. | |
| 9,694,398 | B2 | 7/2017 | Stakutis et al. | |
| 2004/0072529 | A1 * | 4/2004 | Desai | B08B 15/023 454/61 |
| 2005/0024216 | A1 | 2/2005 | Crooks et al. | |
| 2005/0048900 | A1 * | 3/2005 | Scholten | B08B 15/023 454/61 |
| 2006/0079164 | A1 | 4/2006 | DeCastro et al. | |
| 2007/0065134 | A1 | 3/2007 | Sugimoto et al. | |
| 2010/0265316 | A1 | 10/2010 | Sali et al. | |
| 2011/0164032 | A1 | 7/2011 | Shadmi | |
| 2011/0253693 | A1 | 10/2011 | Lyons | |
| 2012/0052792 | A1 | 3/2012 | Sinur et al. | |
| 2013/0000284 | A1 | 1/2013 | Fedorenko et al. | |
| 2013/0213483 | A1 * | 8/2013 | Bagwell | F15D 1/02 137/2 |
| 2014/0080396 | A1 * | 3/2014 | Charles | B08B 15/023 356/614 |
| 2014/0092239 | A1 * | 4/2014 | Pelczynski | G06T 7/13 348/E5.09 |
| 2014/0094106 | A1 * | 4/2014 | McIlhany | F24F 11/52 356/628 |
| 2017/0061630 | A1 * | 3/2017 | Charles | B08B 15/023 |

FOREIGN PATENT DOCUMENTS

| | | | |
|---|---|---|---|
| EP | 0541864 | A1 | 5/1993 |
| EP | 1745866 | A1 | 1/2007 |
| EP | 2901418 | B1 | 7/2018 |
| WO | 9113700 | A1 | 9/1991 |
| WO | 9513146 | A1 | 5/1995 |
| WO | 0033983 | A1 | 6/2000 |

OTHER PUBLICATIONS

International Search Report and Written Opinion, PCT/US2013/062991, 11 pp, dated Dec. 26, 2013.

"The Technology Behind the Microsoft xBox Motion Control System," Geek Dad Blog, 2 pages, printed Sep. 1, 2011.

Holland et al., "Air-Coupled Acoustic Imaging with Zero-Group-Velocity Lamb Modes," vol. 83, No. 13, p. 2704-2706, Sep. 29, 2003.

I.D.E.A., "PrimeSense 3D sensor," 2 pages, printed 2012.

OpenNI, "Program Guide," printed 2012, 21 pages.

Patel et al., "Segmentation of 3D Acoustic Images for Object Recognition Purposes," University College London, 5 pages, before May 2013.

Phoenix Controls Corporation, "Sash Sensors," Jul. 2000.

"Fume Hoods", Stanford Laboratory Standard & Design Guide, Section 1.1, Version 2.0, 24 pages, Dec. 2005.

Hakansson et al., "Sound Focusing by Flat Acoustic Lenses without Negative Refraction," Applied Physics Letters, American Institute of Physics, 3 pages, downloaded Jan. 25, 2005.

Mukhopadhyay, "Synthetic Aperture Sonar 3-D Imaging of Targets in Air Using Multiple, Non-Parallel Shot Lines," Geoscience and Remote Sensing Sympsium, vol. 1, 4 pages, Jul. 25-29, 2005.

Murino, "Reconstruction and Segmentation of Underwater Acoustic Images Combining Confidence Informatino in MRF Models," Pattern Recognition 34, p. 981-997, 2001.

Scientific Equipment & Furniture Association, "Recommended Practices for Laboratory Fume Hoods," SEFA Desk Reference, Revision 1, p. 57-135, 2006.

Stenholt, "Stereo Rendering," Powerpoint Presentation, 45 slides, Before Jun. 2013.

* cited by examiner

CONTROLLING A FUME HOOD AIRFLOW USING AN IMAGE OF A FUME HOOD OPENING

This application is a continuation of co-pending U.S. patent application Ser. No. 15/587,252, filed May 4, 2017 and entitled "CONTROLLING A FUME HOOD AIRFLOW USING AN IMAGE OF A FUME HOOD OPENING", which is itself a continuation of U.S. patent application Ser. No. 13/665,446, filed Oct. 31, 2012, and entitled "CONTROLLING A FUME HOOD AIRFLOW USING AN IMAGE OF A FUME HOOD OPENING", now U.S. Pat. No. 9,694,398, issued Jul. 4, 2017, both of which are incorporated herein by reference.

TECHNICAL FIELD

The present disclosure relates generally to fume hoods, and more particularly to systems and methods for controlling a fume hood airflow using an image of a fume hood opening.

BACKGROUND

Fume hoods are commonly used when personnel are handling potentially harmful materials, particularly substances that give off noxious fumes. Fume hoods can often be found in educational, industrial, medical and government laboratories and production facilities. A typical fume hood may include a housing within which the harmful materials may be stored and used. Users typically access the interior of the fume hood housing through an opening, which in some cases, may be selectively opened and closed via one or more movable sashes or the like. The fume hood housing is typically vented by a ventilation device so that air and potentially harmful gases or other materials within the housing are positively exhausted out of the building through ductwork. Such venting typically draws fresh air in through the fume hood opening, which helps keep any potentially harmful materials within the fume hood and out of the space where personnel may be located.

Proper control of the airflow through a fume hood may be important for safety, cost, comfort and/or other reasons. For example, if airflow through the fume hood opening is too low (e.g., the velocity of air flowing through the opening or face velocity is too low), contaminants inside the fume hood may have an opportunity to exit the fume hood. This may present a safety issue. However, maintaining a high volume airflow through the fume hood at all times may be wasteful because unnecessarily large volumes of conditioned air (e.g., cooled or heated air) within the building may be drawn into the fume hood and exhausted. As a result, additional air must be conditioned and supplied to the building to replace the exhausted air.

SUMMARY

The present disclosure relates generally to fume hoods, and more particularly to systems and methods for controlling a fume hood using an image of a fume hood opening. In some cases, a system for controlling a fume hood may include one or more sensors, a configurator and a controller. In one example, the one or more sensors may be used to provide an image of at least a portion of a fume hood opening. The sensors may be configured to use one or more imaging technologies, either alone or in combination, to provide the image of the fume hood opening. For example, the sensors may include a visible light sensor, an infrared light (IR) sensor, an ultraviolet light (UV) sensor, an acoustic sensor, and/or any other suitable sensor. The configurator may be configured to provide configuration information, such as dimensional information about the opening of the fume hood. In some cases, the configurator may include a memory for storing configuration information about two or more different fume hood models, wherein a user may select the fume hood model. The controller may be configured to use the image provided by the one or more sensors and the dimensional information from the configurator to provide a control signal for providing a desired airflow through the fume hood. In one example, the controller may be configured to detect at least one edge of the fume hood opening using the image from the sensor to determine a measure related to the size of the fume hood opening, and calculate the desired airflow based at least in part on the determined measure related to the size of the fume hood opening. In some cases, a method for controlling airflow through a fume hood may include sensing an image of the fume hood opening using an image sensor, determining a desired airflow in the fume hood using the sensed image of the fume hood opening, and providing a control signal to a ventilation device to produce the desired airflow.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
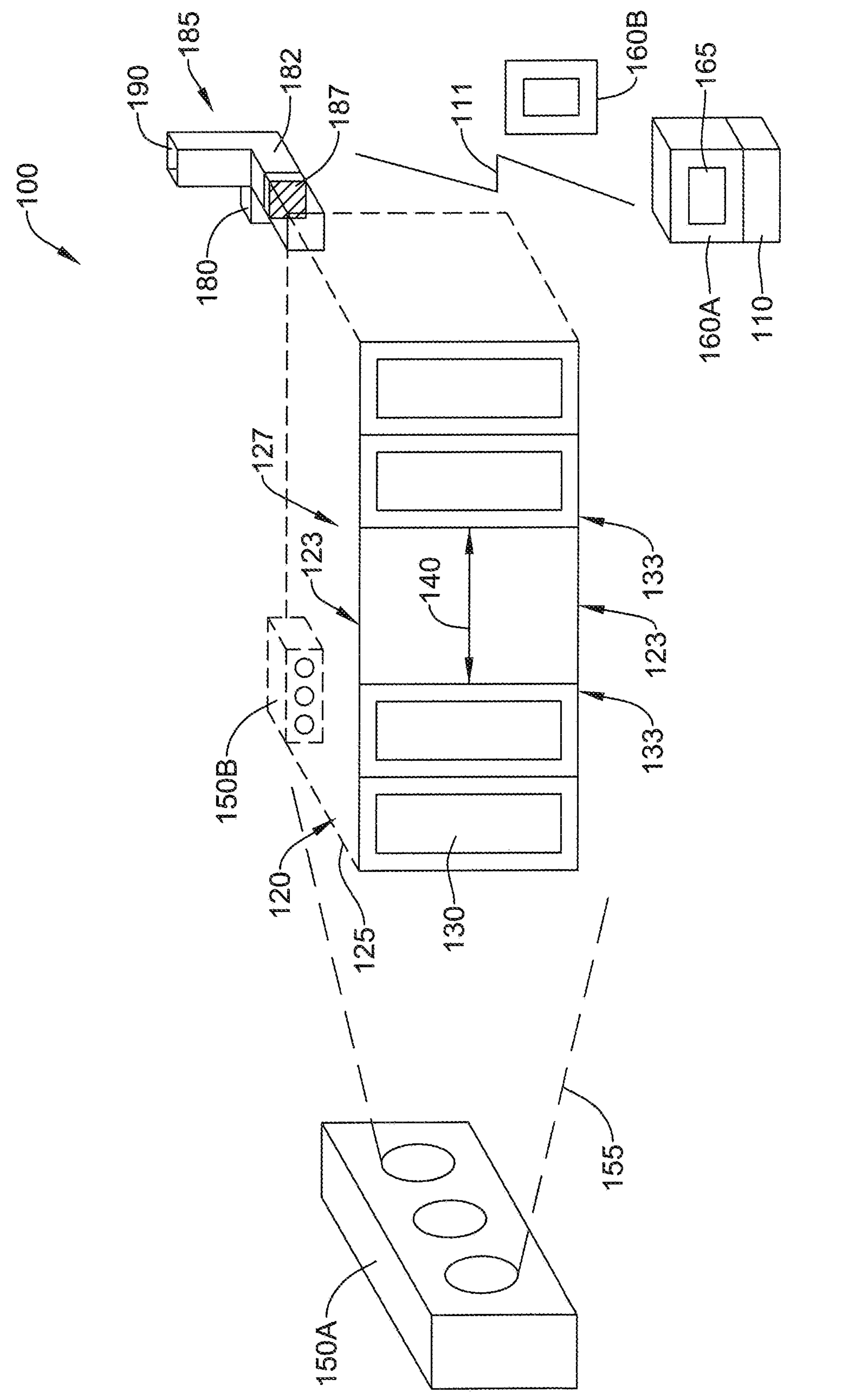
FIG. 1 is a block diagram representation of a fume hood control system using an image sensor.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several illustrative embodiments which are meant to be illustrative in nature.

FIG. 1 is a block diagram representation of a fume hood control system that uses an image sensor. In some cases, the fume hood control system 100 may include a controller 110 for controlling airflow through a fume hood 120. In some cases, the fume hood control system 100 may be used with a biological safety cabinet, a laminar flow cabinet, a balance enclosure and/or another containment enclosure. The fume hood 120 may include one or more movable sashes 130 mechanically coupled to the fume hood, which may define a fume hood opening 140. The controller 110 may calculate the necessary airflow by using, at least in part, an image of the fume hood opening 140 obtained from one or more sensors 150A, 150B, and in some cases, configuration information about the fume hood 120 from a configurator 160. In some cases, the configurator 160 may include a user interface, such as the user interface 165, for allowing a user to configure the fume hood control system 100 based on an installed model of fume hood 120. The controller 110 may then communicate a control signal to a ventilation device 170 to provide the desired airflow through the fume hood opening 140 to an exhaust vent 190 via a communication path 111. The communication path 111 may be a wired or wireless communications path, as desired.

The fume hood control system 100 may be used in, for example, educational, industrial, medical (e.g. biological safety cabinets) and/or government facilities to help facilitate handling of potentially harmful materials, particularly substances that emit noxious fumes or may include pathogens or other harmful agents. Typically, the fume hood 120 may include a housing and/or enclosure 125 within which materials may be stored, examined, and/or used. Users may access the interior 127 of the housing and/or enclosure 125 via the opening 140 using the movable sashes 130. To facilitate containment of the potentially harmful materials within the fume hood 120, a negative pressure may be created in the interior 127 of the housing and/or enclosure 125 (relative to the exterior of the housing and/or enclosure 125) by a ventilation device 180 (e.g., a fan, a blower, etc.) by drawing air through the fume hood opening 140 and exhausting the air through ductwork 182 to an exhaust vent 190, typically at the exterior of the building. Proper airflow may be desirable to prevent harmful materials from exiting the fume hood through the opening 140 and into the space where personnel may be located. In some cases, the ventilation system 185 that includes the ventilation device 180 may include a filter (e.g., a HEPA filter, a ULPA filter, etc.) or other decontamination device 187 (e.g., a scrubber) to help remove harmful materials and/or pathogens from the exhausted air.

Proper control of airflow through the fume hood opening 140 may be important for safety, economic, comfort or other reasons. For example, if airflow through the fume hood opening 140 is too low (e.g., the velocity of air flowing through the opening or face velocity is too low), contaminants inside the fume hood 120 may have an opportunity to exit the fume hood 120 through the opening 140. This may present a safety issue. However, maintaining a high volume of airflow through the fume hood opening 140 at all times may be wasteful because unnecessarily large volumes of conditioned air (e.g., cooled or heated air) in the room may be drawn into the fume hood 120 and exhausted from the building. In such cases, additional air would need to be conditioned and supplied to the room to replace the exhausted air. By controlling the airflow using an image of the opening 140 of the fume hood 120, it has been found that airflow can be maintained at a level that helps ensure safe operation of the fume hood 120, while reducing costs associated with supplying conditioned air to the building where the fume hood 120 is installed. Further, energy required to drive the ventilation device 180 may be reduced, providing additional savings. In some cases, the controller 110 may be configured to control the airflow using a mathematical equation or other algorithm (e.g., using look-up tables). The algorithm and/or equation may be based on information obtained from an image of the opening 140 of the fume hood 120, and in some cases, information about the configuration of the fume hood 120 and/or the ventilation system 185

In some cases, one or more sensors 150A, 150B may be used to obtain an image of the fume hood opening 140. In one example, the sensor 150A, 150B may be placed so that at least a portion of the opening 140 is within the sensor's field of view 155. By using the one or more sensors 150A, 150B, installation cost and/or time may be minimized. For example, the fume hood control system 100 may include the sensor 150A located outside the fume hood 120, sensor 150B located within the interior space 127 of the fume hood 120, or both. The sensors 150A, 150B in the example shown may include one or more sensing technologies for obtaining an image of the fume hood opening, such as a visible light sensor (e.g. CCD), an infrared (IR) light sensor, an ultraviolet (UV) light sensor, an acoustic sensor, and the like. In some cases, the sensors 150A, 150B may be a single sensor, or may include an array of sensors as desired. In some cases, the fume hood control system 100 may include a signal source (e.g., a visible light source, an IR light source, a UV light source, an acoustic wave source, etc.) which may be turned on to increase the image quality of the fume hood opening 140. The signal source may be separate from the sensor (e.g., a discrete signal source unit, an ambient light source, etc.), or may be included in the same housing as the sensor(s) 150A, 150B. For example, the sensor 150A may include a visible light sensor, an infrared light source, and an infrared light sensor. The sensor 150A may obtain a visible light image of the fume hood opening using ambient visible light available at the fume hood 120, and/or an IR image by sensing IR light reflected from the fume hood 120 from the IR light source. In another example, an acoustic source, either included with a sensor unit or separate from the sensor unit, may provide an acoustic signal. The acoustic signal may be reflected from at least a portion of the fume hood and may be sensed by an acoustic sensor.

Fume hoods may come in a number of sizes and/or configurations, often depending on the intended purpose of the fume hood. Typically, fume hoods are used to protect the user and/or the local environment from exposure to hazardous and/or noxious substances, and/or to provide a contained environment for a product and/or experiment. Some fume hoods may be configured to provide explosion protection, spill containment, or other like functions. Often, fume hood manufacturers produce one or more standard configurations. In some cases, a fume hood may be custom designed for a particular application and/or space. For example, a fume hood model may be designed such that a user may select a particular height, width and/or depth for the fume hood enclosure 125, the height and/or width of the fume hood opening 140, the configuration and/or style of sashes 130, and/or other options.

Depending on the application and/or installation, the fume hood 120 may be a bench-mounted fume hood, a floor-mounted fume hood, a portable fume hood, or any other type of fume hood. A bench-mounted fume hood may be installed such that the work surface is positioned at a standing-work height and may be used, for example, in an educational laboratory, an industrial laboratory, or a medical laboratory for limiting exposure to hazardous and/or noxious fumes, vapors, and/or dust. A floor-mounted (e.g., walk-in) fume hood may likewise be used in industrial, educational, or medical settings when large amounts of hazardous materials must be safely contained, while limiting exposure to hazardous and/or noxious fumes, vapors or dust. In some cases, a floor-mounted fume hood may be used to accommodate large amounts of hazardous material, larger equipment, and/or to facilitate access by a number of individuals. A portable fume hood may be used, for example, in settings where a permanently installed fume hood would not be practical, such as in laboratories having limited space and/or where a small containment area is needed, or for temporary or other short term use. Typical uses for a portable fume hood include, but are not limited to, chemical fume control, pharmaceutical compounding containment, soldering applications, light dust removal, biological applications, and other applications.

In some cases, the fume hood opening 140 is defined by one or more sashes 130. The sashes may include panes, doors, strip curtains and/or other structure for enclosing the interior space 127 of the fume hood 120. In some cases, sashes 130 may include a combination of panes, doors and/or strip curtains. For example, the sashes 130 may be configured to open vertically, horizontally, or a combination of horizontally and vertically. In some cases, the fume hood 120 may be configured with one or more vertical moving sashes 130 and strip curtains affixed to the lower edge of the lowest vertical moving sash to allow access to the fume hood interior 127 while still providing very significant containment. In some cases, the fume hood 120 may have two or more openings 140 defined by independently operating sashes 130 into a common interior space 127.

When provided, the configurator 160 may be used to configure the fume hood control system 100 based on the installed components. In some cases, the configurator 160 may be a stand-alone device, or may be incorporated into another device, such as a computer workstation, the controller 110, a mobile device (e.g., a smart phone, a laptop, a tablet, etc.), or any other suitable device. For example, the configurator 160 and/or the controller 110 may be implemented within a fume hood monitor (FHM), such as the Slim Line fume hood monitors and/or the X30 Series fume hood monitors offered by Phoenix Controls of Acton, Mass. The fume hood control system configuration may include a fume hood configuration, a sensor configuration, a ventilation system configuration and/or a zone configuration. In some cases, a user may enter one or more portions of the fume hood control system configuration using the user interface 165 of the configurator 160. For example, the user may select a particular fume hood configuration from one or more fume hood configurations stored in memory. In some cases, the user may manually enter details about the fume hood system configuration. Once entered, the configurator 160 may communicate the configuration, or parameters related to the configuration, to the controller 110 for use in controlling the airflow through the fume hood.

As part of the configuration process, the controller 110 may prompt the user via the user interface 165 (e.g., the graphical user interface) to adjust one or more of the movable sashes 130 to obtain positional information about the fume hood opening 140 using the dimensional information of the identified fume hood 120. For example, the controller 110 may obtain a first image of the fume hood opening 140 from the sensor 150A, 150B when the sashes are at a first specified position and a second image of the fume hood opening 140 when the sashes are at a second specified position. The controller 110 may use the first and second images to calibrate the one or more sensors 150A, 150B based on the configuration information. In some cases, the configuration process may include the controller 110 prompting the user to position the sashes in a fully closed position, to then position the sashes in a fully open position, and then to enter a desired face velocity, air change rate, or other containment affecting set point. As part of the configuration process, the user may save the configuration information to memory, such as a USB flash drive or other storage device, for use with one or more other fume hood installations. In some cases, the controller 110 may be configured to load a saved configuration from memory and/or a storage device in response to a user prompt and/or based on identification information (e.g., a name plate, a bar code, etc.) visible in the image obtained from the sensor 150A, 150B). For example, the identification information may be positioned adjacent to the fume hood opening to be visible in an image obtained by the sensors 150A, 150B.

A fume hood configuration may include information about the fume hood dimensions (e.g., height, width and/or depth), the fume hood opening 140 (e.g., height, width), the sashes 130 (e.g., number of sashes, opening direction, etc.), and/or the number of openings into the interior space 127 of the fume hood 120. A sensor configuration may include information about the number of sensors 150A, 150B, the sensor types (e.g., IR, UV, visible light, acoustic, etc.), and/or the location of the sensors. A ventilation system configuration may include information about the ventilation device 180 (e.g., power ratings, air flow, etc.), the decontamination device 187 (e.g., filter type, scrubber, etc.), and/or duct dimensions (e.g., cross sectional area, length, etc.). Zone information may include information about the number of fume hoods installed in the room and/or zone, and/or information about the building environmental system (e.g., building controller, HVAC controller, alarm system, security system, etc.).

The ventilation system 185 may be configured to maintain an airflow through the fume hood 120. In some cases, the airflow may have a specified minimum airflow (e.g., when the sashes 130 are fully closed), and a specified maximum airflow (e.g. when the sashes 130 are fully open), such as to help ensure safe operation while reducing costs. In one example, the specified ventilation rates may be based on one or more industry standards provided by the American National Standards Institute (ANSI) and/or the American Industrial Hygiene Association (AIHA) (e.g., ANSI/AIHA Z9.5 Laboratory Ventilation), The Occupational Safety & Health Administration (OSHA) (e.g., OSHA Technical Manual, Section III: Chapter 3 Ventilation Investigation, OSHA Part 1910.1450), and/or The Scientific Equipment and Furniture Association (SEFA) (e.g., SEFA 1.2 Laboratory Fume Hoods Recommended Practices). Such standards define airflow requirements at the fume hood opening, typically specifying that the face velocities (e.g., air velocity through the fume hood opening 140) should remain within the range from about 60 feet per minute to about 125 feet per minute. Often, the recommended face velocity may depend on the relative toxicity and/or hazard of the materials within the fume hood 120 or the operations within the fume hood 120, or both.

As noted above, the ventilation system 185 may include a ventilation device 180 operatively coupled to the fume hood 120 via ductwork 182 for drawing air through the fume hood opening 140 to an exhaust vent 190. In some cases, a filter or other decontamination device 187 may be used to filter or otherwise decontaminate the air exiting the fume hood 120. In some cases, the decontamination device 187 may include a scrubber, a high efficiency particulate air (HEPA) filter, a carbon filter, an ultra-low penetration air (ULPA), an acid gas filter, and/or any other suitable decontamination element. The ventilation system 185 may be designed to exhaust the air from the fume hood 120 to a space at the exterior of the building. However, some ventilation systems 185, such as a recirculating ventilation system, may be configured to exhaust (e.g., recirculate) filtered and/or decontaminated air from the interior space 127 of the fume hood 120 into the space in which the fume hood 120 is installed. In some installations (e.g., a teaching laboratory, a medical laboratory, a research laboratory, etc.), one or more fume hoods may be installed in close proximity, such as within a single zone and/or room within a building, and/or within adjacent rooms. In such cases, each fume hood may include a corresponding ventilation device 180, or alternatively, may share a common ventilation device 180 between two or more fume hoods.

Figure 2:
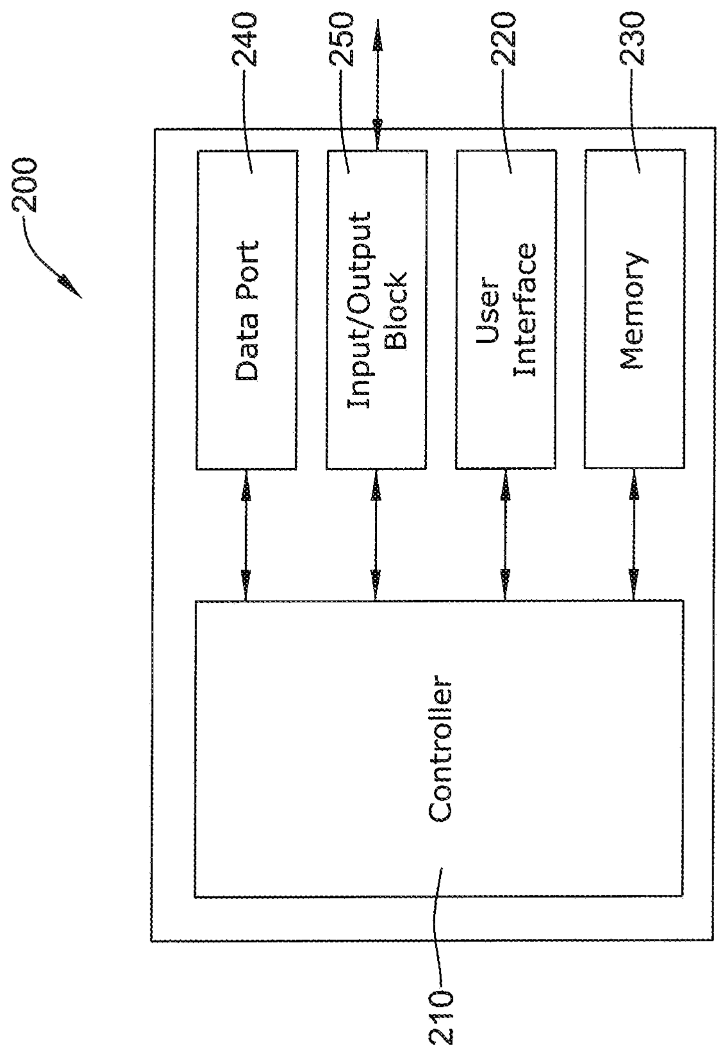
FIG. 2 is a block diagram representation of an illustrative controller of FIG. 1.

FIG. 2 is a schematic view of an illustrative controller 200, such as the controller 110 of FIG. 1. In the illustrative embodiment of FIG. 2, the controller 200 includes a processor (e.g. microprocessor, microcontroller, etc.) 210, a user interface 220, and a memory 230. In some cases, the controller 200 may include an input/output block (I/O block) 250 for receiving one or more signals from the sensors 150A, 150B and/or for providing one or more control signals to the ventilation device 180 via communication path 111. The I/O block 250 may be configured for wired communication via one or more terminal screws and/or wireless communication via a wireless communication interface. In some cases, the I/O block 250 may be used to communicate with other sensors (e.g., image sensors, temperature sensors, pressure sensors, etc.) and/or ventilation devices associated with another fume hood within the same room and/or zone. Alternatively, or in addition to, the I/O block 250 may optionally communicate with one or more HVAC components of the HVAC system, such as a building controller and/or a zone controller. Alternatively, or in addition to, the I/O block 250 may optionally communicate with a security system.

The processor 210 may operate using an algorithm that controls or at least partially controls one or more ventilation devices of a fume hood control system such as, for example, fume hood control system 100 shown in FIG. 1. The processor 210 may, for example, operate in accordance with an algorithm for identifying the size of a fume hood opening and/or providing a command signal to a ventilation device 180 to provide a specified face velocity at the fume hood opening 140. The algorithm may use an image of the fume hood opening and/or a fume hood configuration stored in the memory 230 to determine the geometrical size and/or shape of the fume hood opening 140. Knowing the geometrical size and/or shape of the fume hood opening 140, the algorithm can determine an appropriate ventilation rate to achieve a desired face velocity through the fume hood opening 140. That is, and in some cases, the command signal to the ventilation device 180 may be calculated using the size and/or shape of the fume hood opening 140, configuration information about the fume hood 120, configuration information about the ventilation system 185, and/or the like. In one example, the processor 210 may be configured to operate the algorithm using an operating system (e.g., Windows, OS X, iOS, Android, Linux, Unix, GNU, etc.), or an example embedded operating system (e.g., QNX, NiagaraAX, Windows CE, etc.). In some cases, the controller 200 may include a timer (not shown). The timer may be integral to the processor 210 or may be provided as a separate component.

In the illustrative embodiment of FIG. 2, the user interface 220 may be any suitable user interface that permits the controller 200 to display and/or solicit information, as well as accept one or more user interactions with the controller 200. For example, the user interface 220 (when provided) may permit a user to enter data such as velocity set points, starting times, ending times, diagnostic limits, conditions under which diagnostic limits may be suspended, responses to alerts, and the like. In some cases, user interface 220 may include a display and a distinct keypad. A display may be any suitable display. In some instances, the display may include or may be a liquid crystal display (LCD), and in some cases a fixed segment display or a dot matrix LCD display. If desired, user interface 220 may be a touch screen LCD panel that functions as both display and keypad. In some instances, a touch screen LCD panel may be adapted to solicit values for a number of operating parameters and/or to receive such values, but this is not required.

The memory 230 of the illustrative controller 200 may communicate with the processor 210. The memory 230 may be used to store any desired information, such as the aforementioned control algorithm, the fume hood configuration, the ventilation system configuration, set points, schedule times, diagnostic limits, and/or the like. Memory 230 may be any suitable type of storage device including, but not limited to, RAM, ROM, EPROM, flash memory, a hard drive, and/or the like. In some cases, processor 210 may store information within memory 230, and may subsequently retrieve the stored information.

In some cases, the processor 210 may be programmed to monitor one or more signals received from the fume hood control system 100, either directly or via the I/O block 250, to determine whether or not the fume hood control system and/or the ventilation system 185 has violated a predetermined diagnostic limit for a selected parameter stored in the memory 230. In some cases, for example, the processor 210 may monitor signals from the fume hood control system 100 and/or ventilation system 185 to determine whether or not the fume hood control system 100 has violated a predetermined velocity limit at either the fume hood opening 140 and/or the ventilation device 180. A violation of a predetermined diagnostic limit such as, for example a velocity limit, may occur if the fume hood control system fails to reach a minimum velocity limit or exceeds a maximum velocity limit. In some cases, a violation may occur, for example, if the fume hood control system 100 fails to maintain the face velocity at the fume hood opening 140 above a specified minimum velocity limit. In some cases, a violation may occur when a pressure differential across a filter exceeds a specified limit (e.g. dirty filter). This is just one example. The diagnostic limits and the conditions for violating a diagnostic limit can be dependent upon the fume hood control system set-up, the number and type of components included in the fume hood control system 100 including the ventilation system 185, user preference, user specified conditions for determining a diagnostic fault, and/or the like.

In many cases, when a diagnostic limit has been violated, the processor 210 may be configured to indicate to the user that a diagnostic fault has occurred. This may be accomplished in any of a variety of ways. For example, if the processor 210 has determined that a diagnostic limit has been violated, and a diagnostic fault has occurred, the processor 210 may display a user alert on the display of the user interface 220 of the controller 200 and/or may provide the alert to one or more devices on a building control system (e.g., a building controller, an alarm system, a zone controller, etc.). In some cases, the processor 210 may be programmed to alert the user to a diagnostic fault only after a predetermined number of faults are detected by the processor 210. In some cases, the user alert may be a simple text string displayed on the display of the user interface 220 describing the nature of the violation that has occurred. In other instances, the processor 210 may provide some visual indication and/or audible indication to alert the user that a fault has occurred. Such visual indication may include a colored, flashing, highlighted, or grayed-out button or icon provided on the user interface 220. In some cases, an audible indication may be used to alert a user that a fault has occurred using, for example, a speaker located near the fume hood 120 and/or the user interface 220 of the controller 200. In still other instances, the processor 210 may be configured to send an email, instant message, text message, voice message or some other message to a user to alert the user that a fault has occurred via an internet gateway or other device (e.g. an internet gateway) that is adapted to communicate over the internet or other wide area network. Such an alert may be provided to the user even when the user is away from the building, or other structure in which the fume hood control system 100 is located.

As discussed above, the processor 210 may operate in accordance with an algorithm for identifying the size of a fume hood opening 140 and/or providing a command signal to a ventilation device 180 to provide a specified face velocity at the fume hood opening 140. The algorithm may cause the processor 210 to determine the size and/or shape of the fume hood opening 140 continuously, or at a specified interval (e.g., about 5 seconds, about 15 seconds, about 30 seconds, etc.). For example, the processor 210 may identify the size of the fume hood opening 140 using an image obtained from the sensor 150A, 150B and generate a command signal to the ventilation device 180 based on the identified size of the fume hood opening 140. The command signal may cause the ventilation device 180 to provide a specified airflow (e.g., face velocity, air change rate, etc.) through the fume hood. In some cases, the processor 210 may be configured to issue an alarm, an alert, or other diagnostic fault, when the processor 210 is unable to identify the size and/or shape of the fume hood opening 120. For example, the processor may be unable to identify one or more edges of the fume hood opening 140 from the image obtained from the sensor 150A, 150B and generate a diagnostic fault. In such cases, the processor 210 may be configured to notify a user of the fault condition via an alarm (e.g., a visual alert, an audible alert, a message, etc.), to provide a command signal to the ventilation device to operate at a predetermined airflow (e.g., a maximum face velocity, a maximum air change rate, etc.), or both. In some cases, the processor 210 may be configured to automatically obtain another image from the sensor 150A, 150B to determine the size and/or shape of the fume hood opening during an existing fault condition.

In some cases, as illustrated in FIG. 2, the controller 200 may include a data port 240. The data port 240 may be a wireless port such as a Bluetooth™, WiFi, Zigbee or any other wireless protocol. In other cases, data port 240 may be a wired port such as a serial port, an ARCNET port, a parallel port, a serial port, a CATS port, a USB (universal serial bus) port, and/or the like. In some cases, Data port 240 may use one or more communication protocols, such as Ethernet, BACNet, LONtalk, etc., that may be used via a wired network or a wireless network. In some instances, data port 240 may be a USB port and may be used to download and/or upload information from a USB flash drive or some other data source. Other remote devices may also be employed, as desired.

The data port 240 may be configured to communicate with the processor 210 and may, if desired, be used to upload information to the processor 210 and/or download information from the processor 210. Information that can be uploaded and/or downloaded may include, for example, values of operating parameters. In some instances, data port 240 may be used to upload a previously-created fume hood configuration, sensor configuration, and/or ventilation system configuration into the controller 200, thereby hastening the programming process. In some cases, the data port 240 may be used to download a fume hood configuration, sensor configuration, and/or ventilation system configuration that has been created using the configurator 160, so that the configuration(s) may be downloaded and transferred to other similar controllers, hastening their programming process. In some cases, the data port 240 may be used to upload and/or download information pertaining to a fume hood dealer and/or service provider, if desired.

In some cases, the data port 240 may be used to download data stored within the memory 230 for analysis. For example, the data port 240 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other device, as desired. In some cases, the data may be convertible to an MS EXCEL®, MS WORD®, text, XML, and/or Adobe PDF® file, but this is not required.

Figure 3:
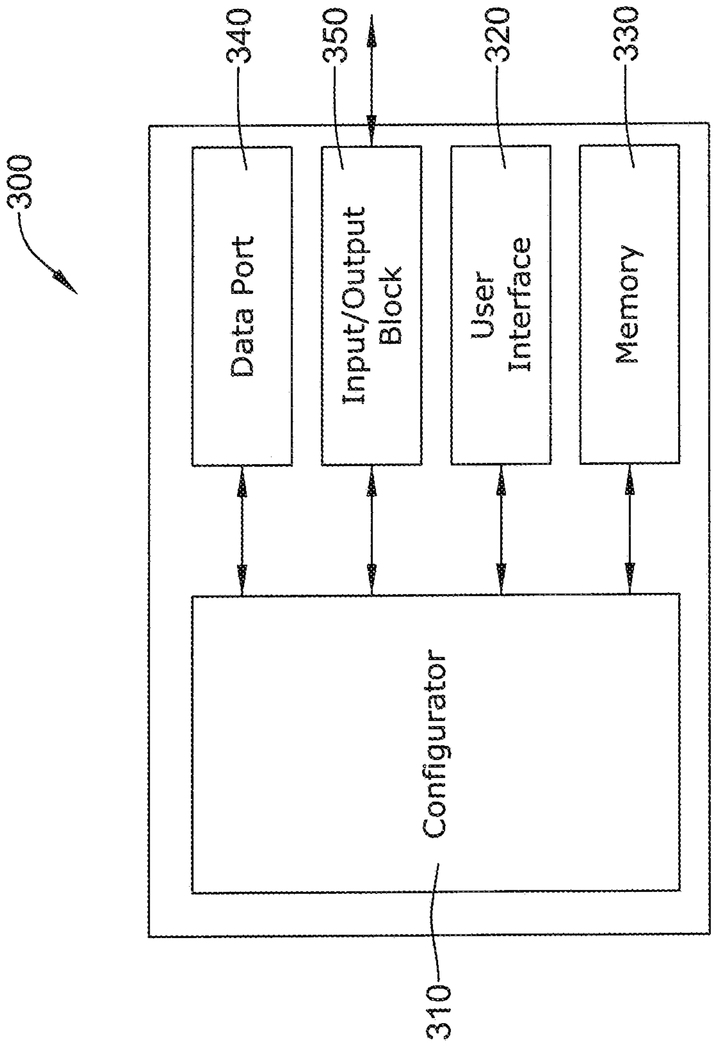
FIG. 3 is a block diagram representation of an illustrative configurator of FIG. 1.

FIG. 3 is a schematic view of an illustrative configurator 300, such as the configurator 160 of FIG. 1. In the illustrative embodiment of FIG. 2, the configurator 300 includes a processor (e.g. microprocessor, microcontroller, etc.) 310, a user interface 320, such as user interface 365, a memory 330, and a data port 340. The processor 210 may operate to facilitate user interaction with the configurator 160 via the user interface 320 using instructions running in an operating system, such as Windows, OS X, iOS, Android, Linux, Unix, GNU, and the like, or an embedded operating system such as QNX, NiagaraAX, Windows CE, and the like. In some cases, the configurator 300 may be a stand-alone unit. In other cases, the configurator 300, or parts of the configurator, may be included in another device, such as a computer workstation and/or the controller 200. In some cases, the configurator 300 may be wall-mountable.

In the illustrative embodiment of FIG. 3, the user interface 320 may be any suitable user interface that permits the configurator 300 to display and/or solicit information, as well as accept one or more user interactions with the configurator 300. For example, the user interface 320 may permit a user to enter data such as a model number of a selected fume hood 120 and/or other information about the fume hood configuration, such as a number, size, and/or style of sashes 130 installed at the opening 140 of the fume hood. For example, a user may select a fume hood configuration from two or more available fume hood configurations stored in the memory 330. In some cases, the user interface 320 may allow a user to enter information about the ventilation system 185, such as model information and/or ratings information for the ventilation device 180 and/or the filter 187, and the like. The user may select a ventilation system configuration from one or more configurations stored in the memory 330. A display may be any suitable display. In some instances, a display may include or may be a liquid crystal display (LCD), and in some cases a fixed segment display or a dot matrix LCD display. If desired, the user interface 165 may be a touch screen LCD panel that functions as both display and keypad. In some instances, a touch screen LCD panel may be adapted to solicit values for a number of operating parameters and/or to receive such values, but this is not required.

The memory 330 of the illustrative configurator 300 may communicate with the processor 310 and/or the user interface 320. The memory 330 may be used to store any desired information, such as one or more fume hood configurations, one or more ventilation system configuration, set points, schedule times, diagnostic limits, and the like. The memory 330 may be any suitable type of storage device including, but not limited to, RAM, ROM, EPROM, flash memory, a hard drive, and/or the like. In some cases, the processor 310 may store information within the memory 330, and may subsequently retrieve the stored information. For example, the processor 310 may store a configuration (e.g., a fume hood configuration and/or a ventilation system configuration) that was entered by a user into the memory. Subsequently, the stored configuration may be selectable by a user at the user interface for another system configuration.

The data port 340 may be a wireless port such as a Bluetooth™, WiFi, Zigbee or any other wireless protocol. In other cases, data port 340 may be a wired port such as a serial port, an ARCNET port, a parallel port, a serial port, a CATS port, a USB (universal serial bus) port, and/or the like. In some cases, the data port 340 may use one or more communication protocols, such as Ethernet, BACNet, LONtalk, etc., that may be used via a wired network or a wireless network. In some instances, data port 340 may be a USB port and may be used to download and/or upload information from a USB flash drive or some other data source. Other remote devices may also be employed, as desired.

The data port 340 may be configured to communicate with the processor 310 and may, if desired, be used to upload information to the processor 310 and/or download information from the processor 310. Information that can be uploaded and/or downloaded may include, for example, one or more configuration parameters. In some instances, the data port 340 may be used to upload a previously-created fume hood configuration and/or ventilation system configuration into the configurator 300, thereby hastening the programming process. In some cases, the data port 240 may be used to download a fume hood configuration and/or ventilation system configuration that has been created using the configurator 160 to one or more controllers 110, 200. In some cases, the data port 240 may be used to upload and/or download information pertaining to a fume hood dealer or service provider, if desired.

In some cases, the data port 340 may be used to download data stored within the memory 330 for analysis. For example, the data port 340 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XML, and/or Adobe PDF® file, but this is not required.

Figure 4A:
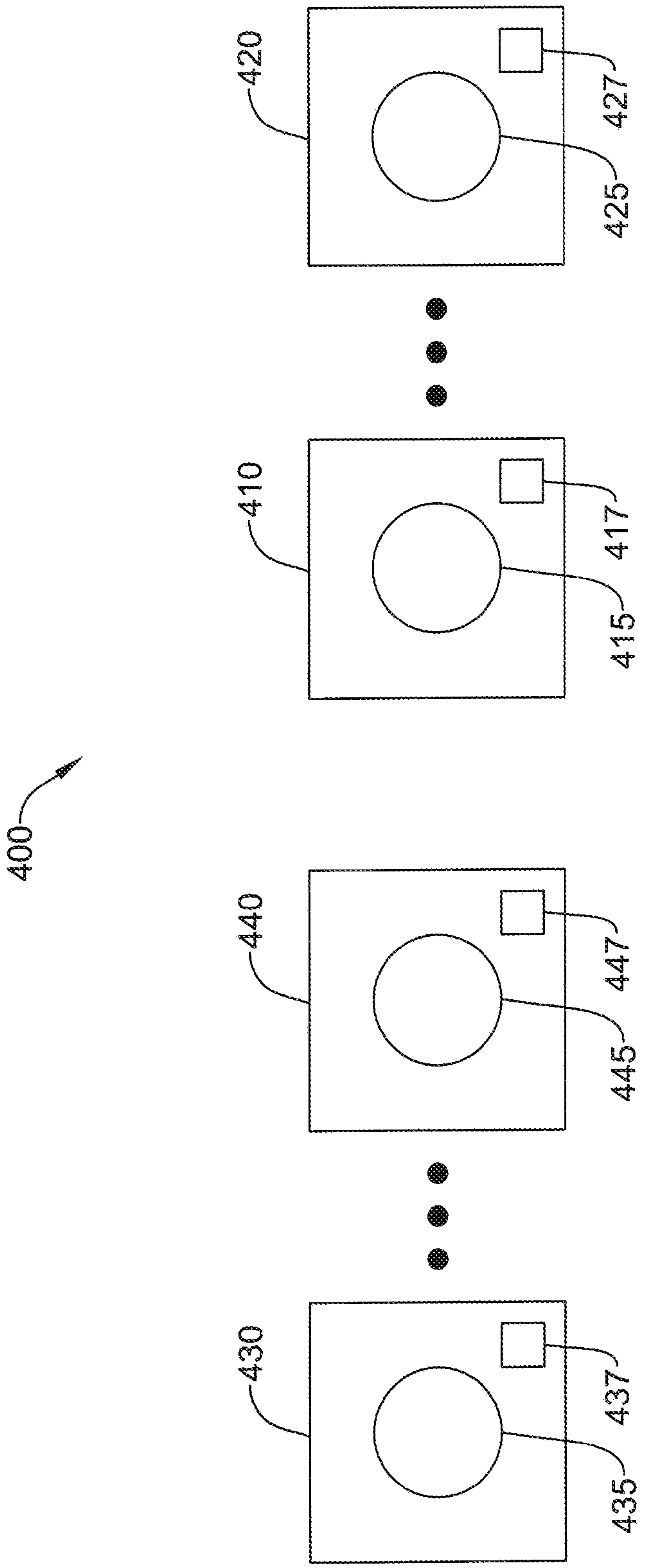
FIG. 4A is a block diagram representation of an illustrative image sensor and/or image sensor system of FIG. 1.

FIG. 4A is a block diagram representation of an illustrative image sensor system 400 that may include the sensors 150A, 150B of FIG. 1. In some cases, an image sensor system 400 may include one or more source units 410, 420, one or more sensor units 430, 440, or a combination of the source units 410, 420 and sensor units 430, 440. The source units 410, 420 may be configured to provide optical energy (e.g., visible light, IR light, UV light, etc.) and/or acoustic energy (e.g., ultrasonic acoustic energy) via an energy source 415, 425, such as a light source (e.g., a lamp, an LED, etc.) or an acoustic energy source (e.g., an ultrasonic energy source), for use in gathering information about the opening of the fume hood 120. The sensor units 430, 440 may include one or more image sensors 435, 445 capable of obtaining an image (e.g., an optical image, an acoustic image, etc.) including at least a portion of the fume hood opening 140. The source unit 410, 420 and/or sensor unit 430, 440 may include a communication circuit 417, 427, 437, 447 for communicating with one or more other devices for analysis and/or processing, such as the controller 110 of FIG. 1 or the controller 200 of FIG. 2, using a wired and/or wireless communication link.

In some cases, the source units 410, 420 may include a light source 415, 425 capable of emitting light having a specified spectrum (e.g., visible light, infrared light, ultraviolet light, etc.) to illuminate at least a portion of the fume hood 120, such as an area adjacent to and/or including at least a portion of the fume hood opening 140. For example the source units 410, 420 may include a light source capable of providing optical energy over one or more particular spectra, such as a visible light source, an infrared light source, an ultraviolet light source, or a combination of such sources. In one example, a light source 410, 420 may be configured to produce light having a particular optical spectrum, for example, in the visual spectrum, the infrared spectrum and/or the ultraviolet spectrum. Examples of such light sources may include a lamp and/or a light emitting diode (LED) configured to emit light at a predefined spectrum.

In some cases, the image sensor system 400 may include one or more single sensor units 430, 440 for obtaining an image including at least a portion of the fume hood opening 140. For example, the single sensor unit 430, 440 may be a device capable of obtaining an image using ambient light, such as an optical still camera or a video camera, a thermographic camera, or the like. For example, the image sensors 435, 445 may include a charge-coupled device (CCD) image sensor, an N-type metal-oxide-semiconductor (NMOS) linear image sensor, a complementary metal-oxide-semiconductor (CMOS) linear image sensor, a photodiode array with amplifier, an InGaAs linear image sensor, a microbolometer, and the like. In some cases, the image sensors 435, 445 may be capable of obtaining an image within a single spectrum or over multiple spectra. For example, a CCD may be capable of obtaining an image over a wide spectral range including visible light, IR light and UV light. A microbolometer may be capable of obtaining an image in a more limited spectra, such as in part or all of the infrared spectra. The particularly source units 410, 420 may be paired with the particular image sensors 435, 445 so that the image sensors 435, 445 may obtain relevant images.

In some cases, the source unit 410, 420 may be configured to emit acoustic energy (e.g., ultrasonic acoustic energy) towards the fume hood 120. One or more sensor units 430, 440 may be used to detect acoustic energy reflected by at least a portion of the fume hood 120. In some cases, the sensor units 430, 440 may include a single acoustic sensor 435, 445 or may include an array of acoustic sensors 435, 445. In some cases, the source unit 410, 420 may include an acoustic lens such that the source unit 410, 420 may be capable of providing an acoustic beam having a specified beam width and/or field of view, if desired.

As noted above, the source units 410, 420 and/or the sensor units 430, 440 may include a communication circuit 417, 427, 437, 447 to facilitate communication with a controller, such as the controller 110 of FIG. 1. When one or more source units 410, 420 are provided, the controller 110 may send a command to the source units 410, 420 to illuminate at least a portion of the fume hood 120. The controller 110 may also send a command to the one or more sensor units 430, 440 to capture an image including at least a portion of the fume hood opening 140. In one example, the source unit 410 may emit visible light energy from the light source 415 in response to a command from the controller 110 received by the communication circuit 417, 427. In some cases, the source unit 410, 420 may include a timer circuit, not shown, that may cause the source unit 410, 420 to emit light for a specified duration, wherein the duration may be specified by the controller 110. In some cases, the sensor unit 430, 440 may obtain an image in response to a command received from the controller 110. For example, the controller 110 may request that the sensor unit 430, 440 obtain an image continuously, in response to a particular command, and/or after a specified duration. The sensor unit 430, 440 may then communicate information, such as the captured image including at least a portion of the fume hood opening 140, to the controller 110 using the communication circuit 437, 447. In some cases, the sensor units 430, 440 may communicate an image (e.g., an optical image, an acoustic image) to the controller 110 for analysis, such as to detect an edge of the fume hood opening using an edge detection algorithm. After capturing an image and communicating image information to the controller 110, the sensor unit 430, 440 may communicate additional information corresponding to the captured image. Such additional information may include timing information (e.g., time stamp, duration, duty cycle, etc.), spectrum information (e.g., energy level, wavelength, etc.), and/or any other suitable information, as desired.

Figure 4B:
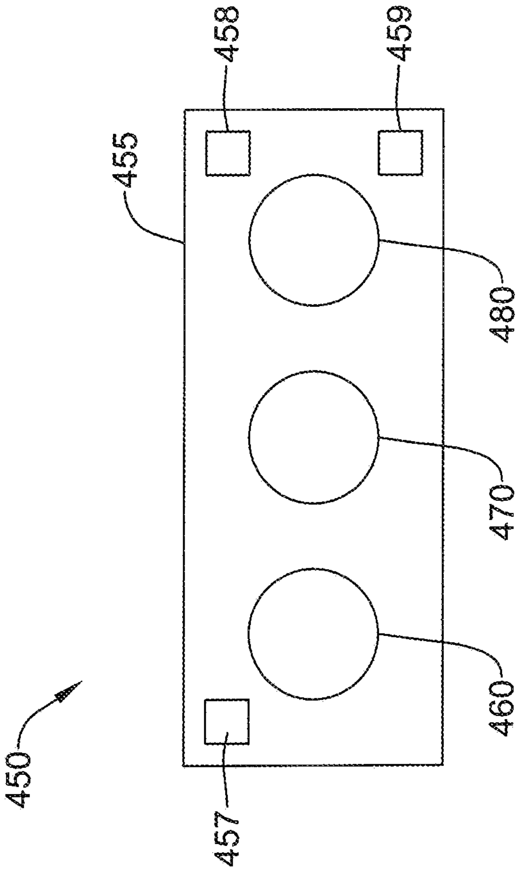
FIG. 4B is a block diagram representation of an illustrative image sensor of FIG. 1.

FIG. 4B is a block diagram representation of an illustrative image sensor unit 450, such as the sensors 150A, 150B of FIG. 1. In some cases, the sensor unit 450 may include one or more sources 460 and one or more sensors 470, 480 integrated into a common housing 455. The sensor unit 450 may further include a processor 457, a memory 458, and a communication circuit 459. In some cases, the sensor unit 450 may be capable of capturing one or more two dimensional images, and/or produce a three-dimensional image. Some example of the sensor unit 450 may include the Kinect® sensor unit from Microsoft, the Xtion® sensor family from ASUS, and the PrimeSense® 3D Sensor from Primesense. These are just some examples.

In some cases, the source 460 may be a light source capable of emitting light (e.g., light energy, acoustic energy, etc.) at a specified spectrum (e.g., infrared light) to illuminate at least a portion of the fume hood 120. The sensor unit 450 may include one or more image sensors 470, 480 capable of capturing an image of the fume hood opening at one or more spectra (e.g., a visible light image, an infrared light image, an ultraviolet light image, etc.). The sensors 470, 480 may be capable of capturing a still image and/or a video image. In one example, the sensor unit 450 may include a visible light sensor 470 (e.g., a visible light camera), and an infrared light sensor 480 (e.g., an infrared light camera).

The processor 457 may access instructions and/or other information (e.g., parameters) stored in the memory 458. The memory 458 may include instructions for controlling the emission of light from the light source 460, for capturing one or more images from the image sensors 470, 480 and/or for processing the one or more captured images. For example, the processor 457 may control the light source 460 in order to project IR light (e.g., a pattern of IR light) to illuminate at least a portion of the fume hood including at least a portion of the fume hood opening 140 and/or the sashes 130. The processor 457 may then cause the sensor 470 to capture an IR light image and the sensor 480 to capture a visible light image. In some cases, the processor 457 may process the IR light image and/or the visible light image to produce a two or three dimensional image including at least a portion of the fume hood opening 140.

Figure 5A:
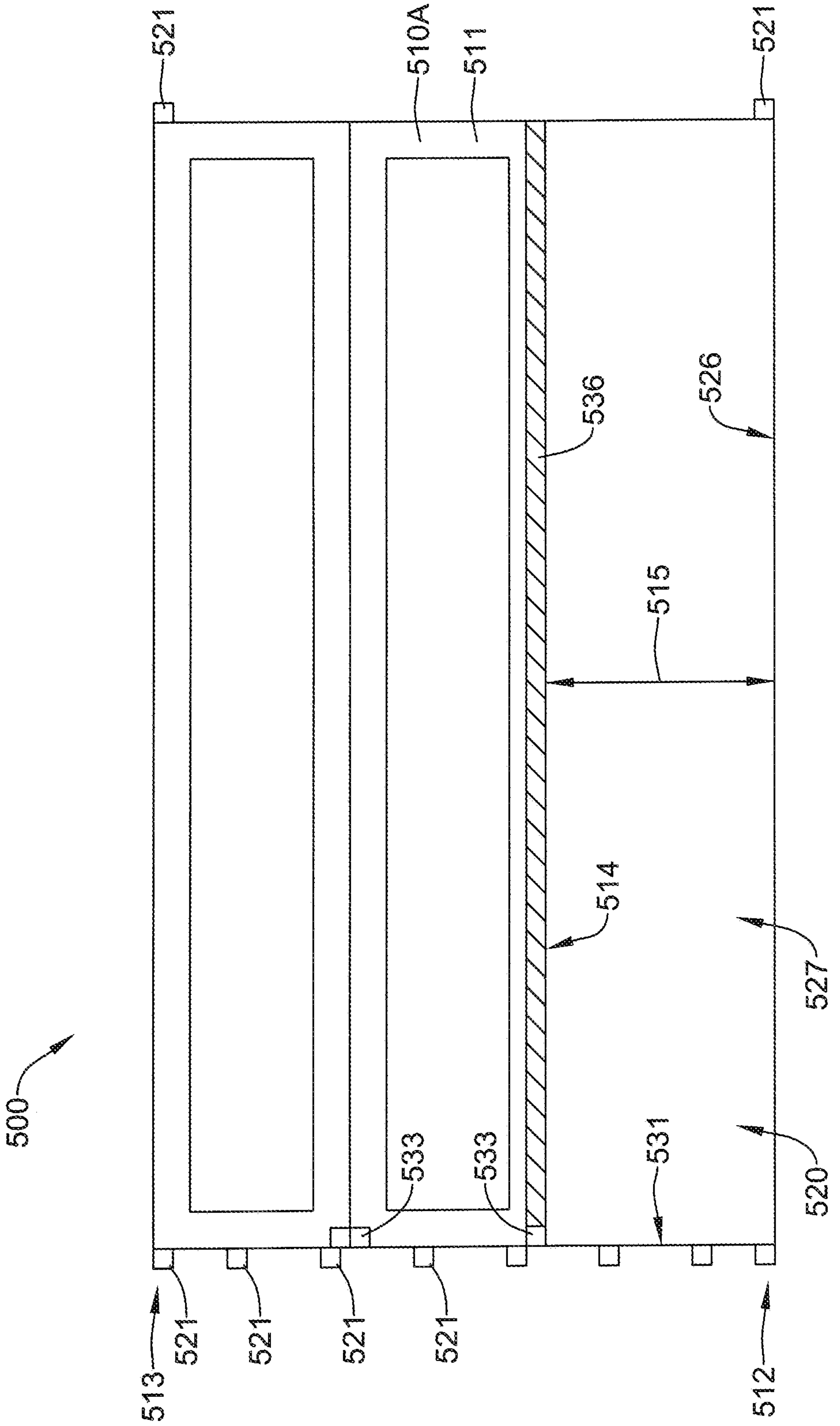
FIGS. 5A and 5B show illustrative fume hood openings having sashes that move in a vertical direction.
Figure 5B:
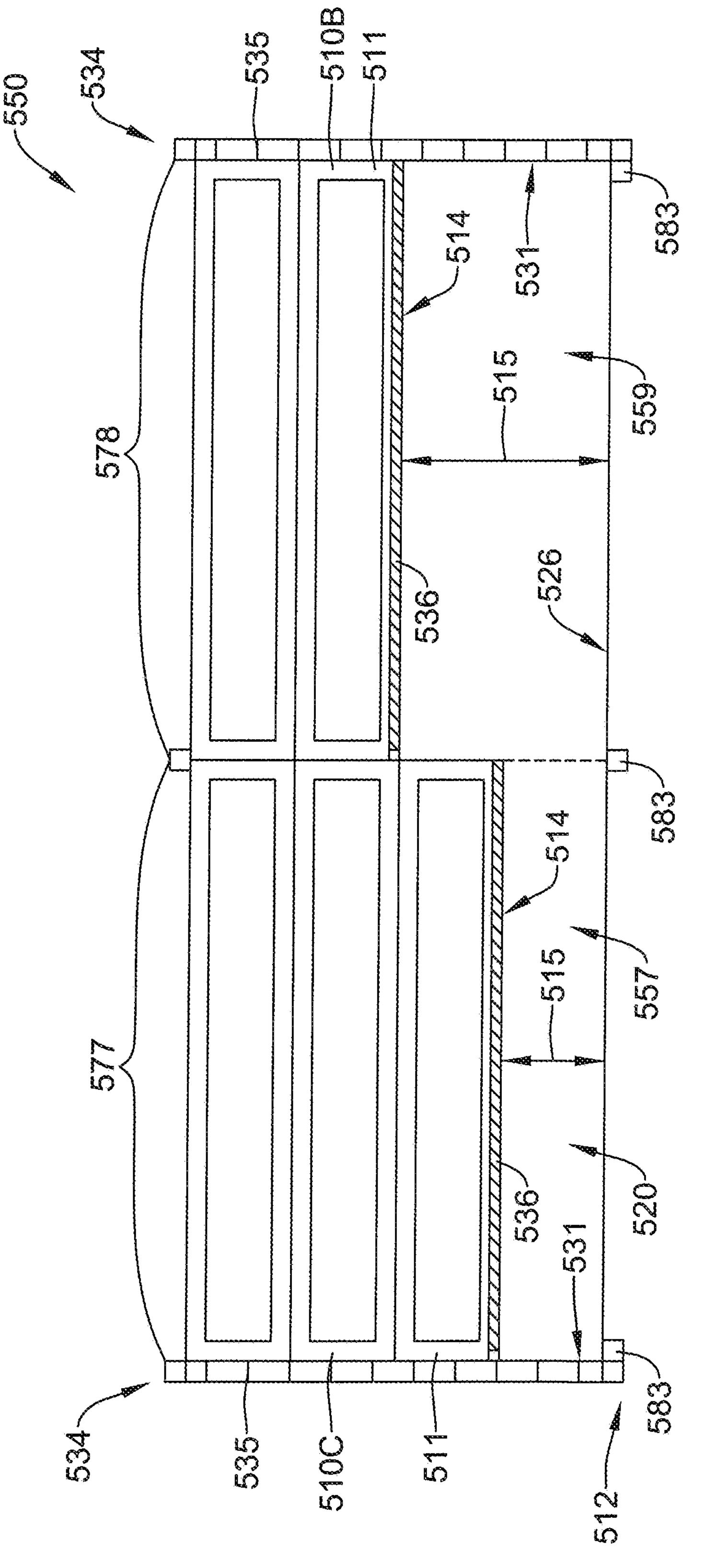

FIGS. 5A and 5B show illustrative fume hoods 500, 550 having vertically moving sashes 510A-C. The sashes 510A-C may include one or more panes 511 that can slide up and/or down to define an opening 520 for accessing the interior of the fume hood 500, 550. For example, the fume hood 500 is shown to have an opening 520 having a rectangular area 527 defined by the variable vertical position (e.g., the height 515) of the sash 510A and the width of the sash 510A. Similarly, the fume hood 550 is shown to have an opening 520 including two or more contiguous rectangular areas 557, 559. The rectangular area 557 may be defined by the vertical position (e.g., the height 515) of the sash 510B and the width of the sash 510B and may be contiguous with the rectangular area 557 defined by the vertical position (e.g., the height 515) of the sash 510C and the width of the sash 510C. Generally, the width of each rectangular area 527, 557, 559 is fixed and corresponds to the width of the corresponding sash 510A-C. The height 515 of each rectangular area 527, 557, 559 may be variable. For example, the height 515 may vary between zero (e.g., when the sash 510A-C is in the fully closed position 512) and a maximum height (e.g., when the sash 510A-C is positioned at the fully open position 513).

As discussed above, the sensor units 150A, 150B of FIG. 1 and the sensor units 430, 440, 450 of FIG. 4 may be configured to obtain an image of the opening 520 of the fume hoods 500,550. The controller 110 may then analyze the obtained image to determine the size (e.g., the dimensions) and/or shape (e.g., rectangular) of the opening 520, such as by using an edge detection algorithm. To facilitate the edge detection capabilities of the controller 110, one or more materials (e.g. tape, paint, etc.) may be used to mark the horizontal and/or vertical edges adjacent to the fume hood opening 520. In some cases, the materials (e.g., titanium dioxide, metalized foil, etc.) may be reflective over two or more spectra (e.g., visible light, IR light, etc.). In some cases, the materials may be transparent over a first spectrum and reflective at a second spectrum. For example, a material (e.g., cadmium stannate, cadmium stannate doped with copper, zinc oxide doped with gallium, etc.) may be capable of reflecting infrared light and be at least partially transparent to visible light. In some cases, a coating (e.g. indium tin oxide, transparent gold) may be applied to at least a portion of one or more panes of the sash 510A-C that may be transparent to visible light and reflective to IR and/or UV light.

In some cases, the edges of the opening 520 of the fume hood 500, 550 may be enhanced using one or more markings and/or indicators 521 located on a surface adjacent to the opening 520 and one or more markings and/or indicators 533 along an edge of the sash 510A-C. For example, one or more indicators 521, 533 may be distributed on a surface adjacent to the vertical edge 531 of the opening 520. The indicators may be discrete indicators 521 having a specified size and/or a specified spacing. In some cases, the indicator may be in the form of a vertical scale 534 having regularly spaced markings 535. In some cases, one or more indicators 583 may be distributed adjacent to the lower edge 526 of the fume hood opening 520 and may serve to define the lower edge 526. In some cases, the indicators 533 may include multiple indicators 533 distributed along a vertical edge of the sash 510A, or may be a single indicator 536 physically located adjacent to a lower edge 514 of the sash 510A. In some cases, the indicators 536 may extend a distance along the lower edge 514 of the sash 510B, 510C. The distance may be any distance up to and including the width 577, 578 of the sash 510B, 510C. In some cases, information about the size, location and/or composition of the indicator 521, 533, 536, and/or scale 534, 535 may be stored in the memory of the configurator 160 and/or the controller 110 for use during the configuration process of the fume hood control system.

Figure 6A:
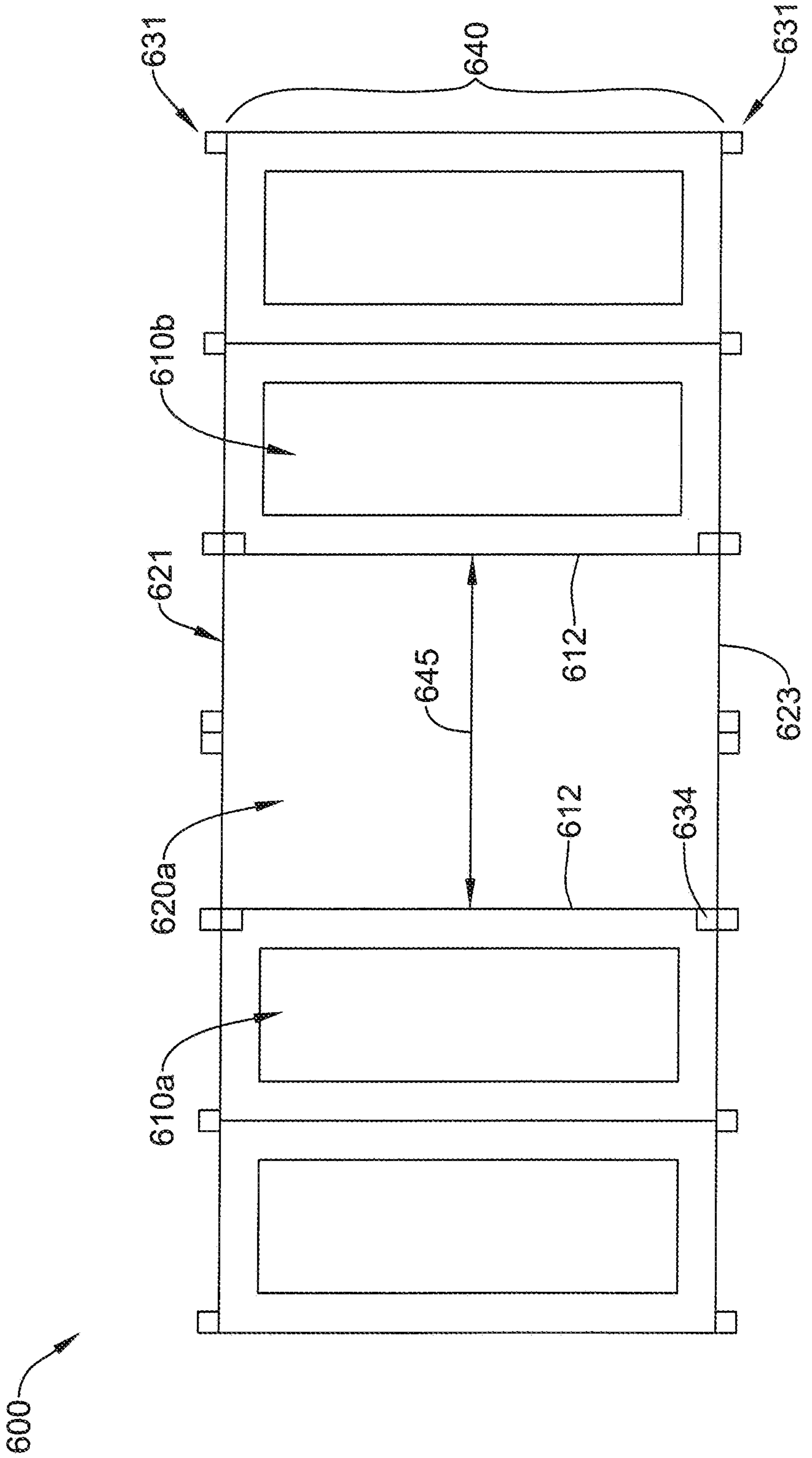
FIGS. 6A and 6B show illustrative fume hood openings having sashes that move in a horizontal direction.
Figure 6B:
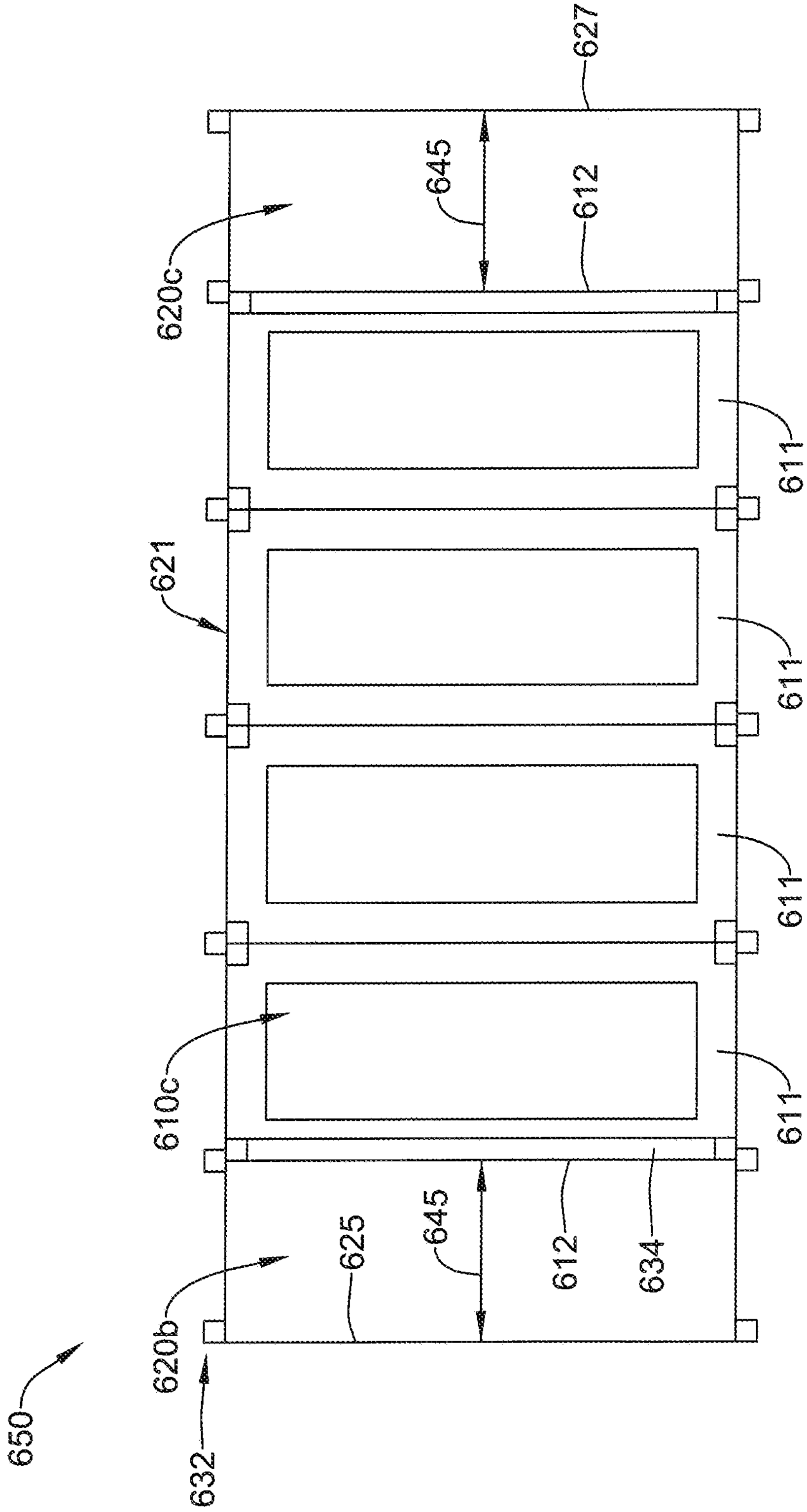

FIGS. 6A and 6B show illustrative fume hoods 600, 650 having horizontally moving sashes 610A-C. In some cases, the fume hood 600 may be configured having two horizontally moving sashes 610A, 610B having one or more panes. The sashes 610A, 610B may be configured to slide horizontally, in opposite directions, to produce a center opening 620A. The center opening 620A may have a generally rectangular shape having a height 640 and a width 645. In some cases, a fume hood 650 may include a sash 610C having one or more panes 611 capable of sliding horizontally to produce a left side opening 620B, a right-side opening 620C, or both. The panes 511 of the sash 510C may be configured to move independently such that the panes 511 may be positioned to form a center-opening 620A, a left-side opening 620B, a right-side opening 620C, or a combination of openings 620A-C. As discussed above, the edges defining the openings 620A-C may be enhanced using one or more markers, indicators 631 and/or scales 632 distributed adjacent to a horizontal edge (e.g., the top edge 621, the bottom edge 623) of the fume hood opening 620A-C Likewise, the vertical edges 625, 627, 612 of the fume hood openings 620A-C may be enhanced using one or more indicators 634, wherein the indicators may have a length up to and including the height 640 of the sash 610A-C.

Figure 7:
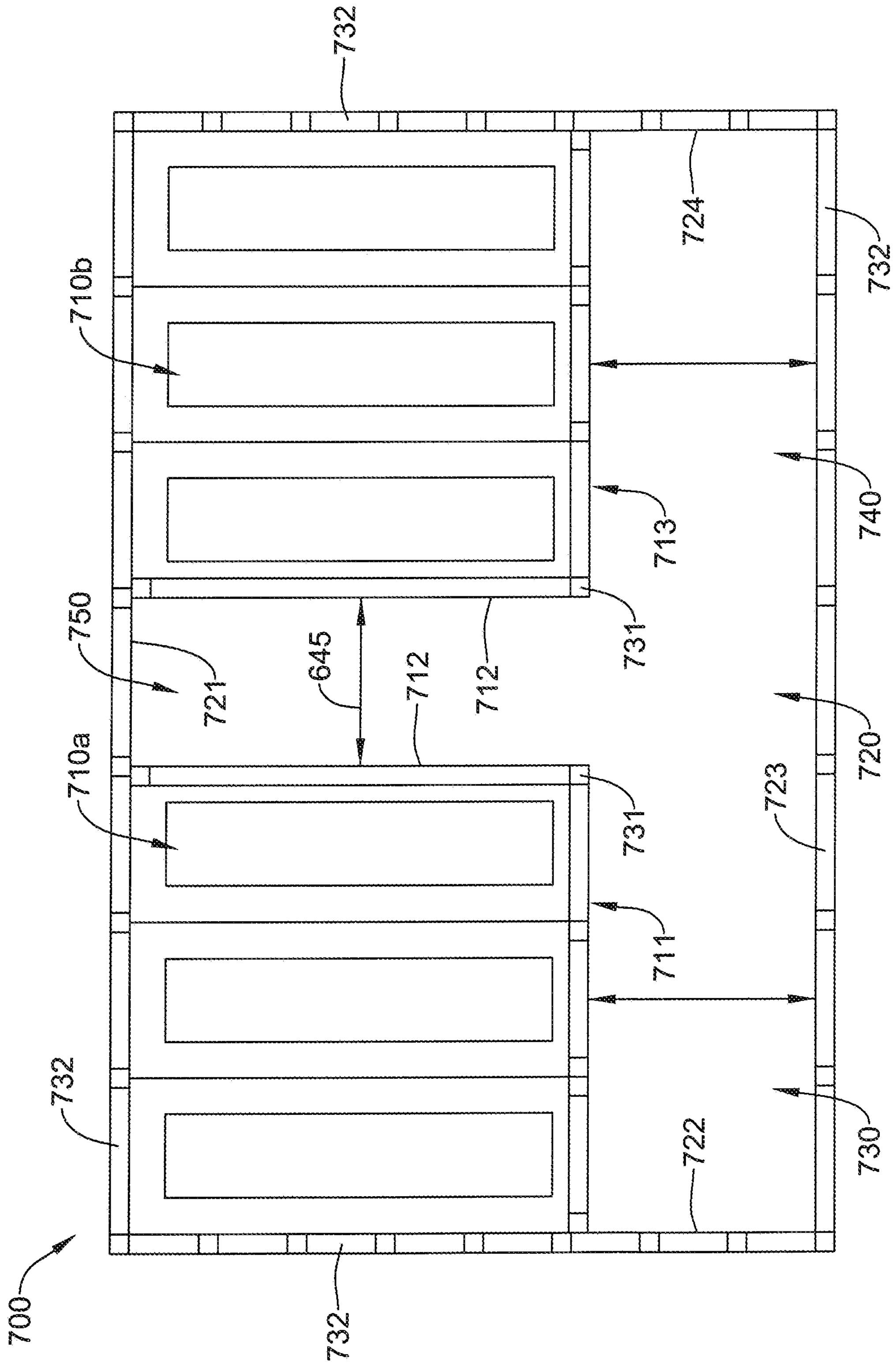
FIG. 7 shows an illustrative fume hood opening having sashes that move in both a horizontal direction and a vertical direction.

FIG. 7 shows an illustrative fume hood 700 having sashes 710A, 710B capable of moving in both the horizontal direction and the vertical direction. For example, the sash 710A may be moved vertically to expose a first open area 730 of the hood opening 720. Likewise, the sash 710B may be moved vertically to expose a second open area 740 of the hood opening 720. The sashes 710A and 710B may be moved independently or simultaneously, such that the hood opening 720 may include the open area 730 only, the open area 740 only, or both. Additionally, the sashes 710A and 710B may be moved horizontally to expose a third open area 750 of the hood opening 720, wherein the third open area 750 lies between two planes defined by the vertical edges 712, 714 of the sashes 710A, 710B. As discussed above, the edges defining the opening 720 may be enhanced using one or more markers, indicators 731 and/or scales 732 distributed adjacent to a horizontal edge (e.g., the top edge 721, the bottom edge 723) of the fume hood opening and/or a horizontal edge 711, 713 of the sashes 710A, 710B. Similarly, the vertical edges of the fume hood opening may be enhanced by using one or more markers, indicators 731 and/or scales 732 distributed adjacent to a vertical edge 722, 724 of the fume hood opening and/or the vertical edges 712, 714 of the sashes 710A, 710B.

Figure 8:
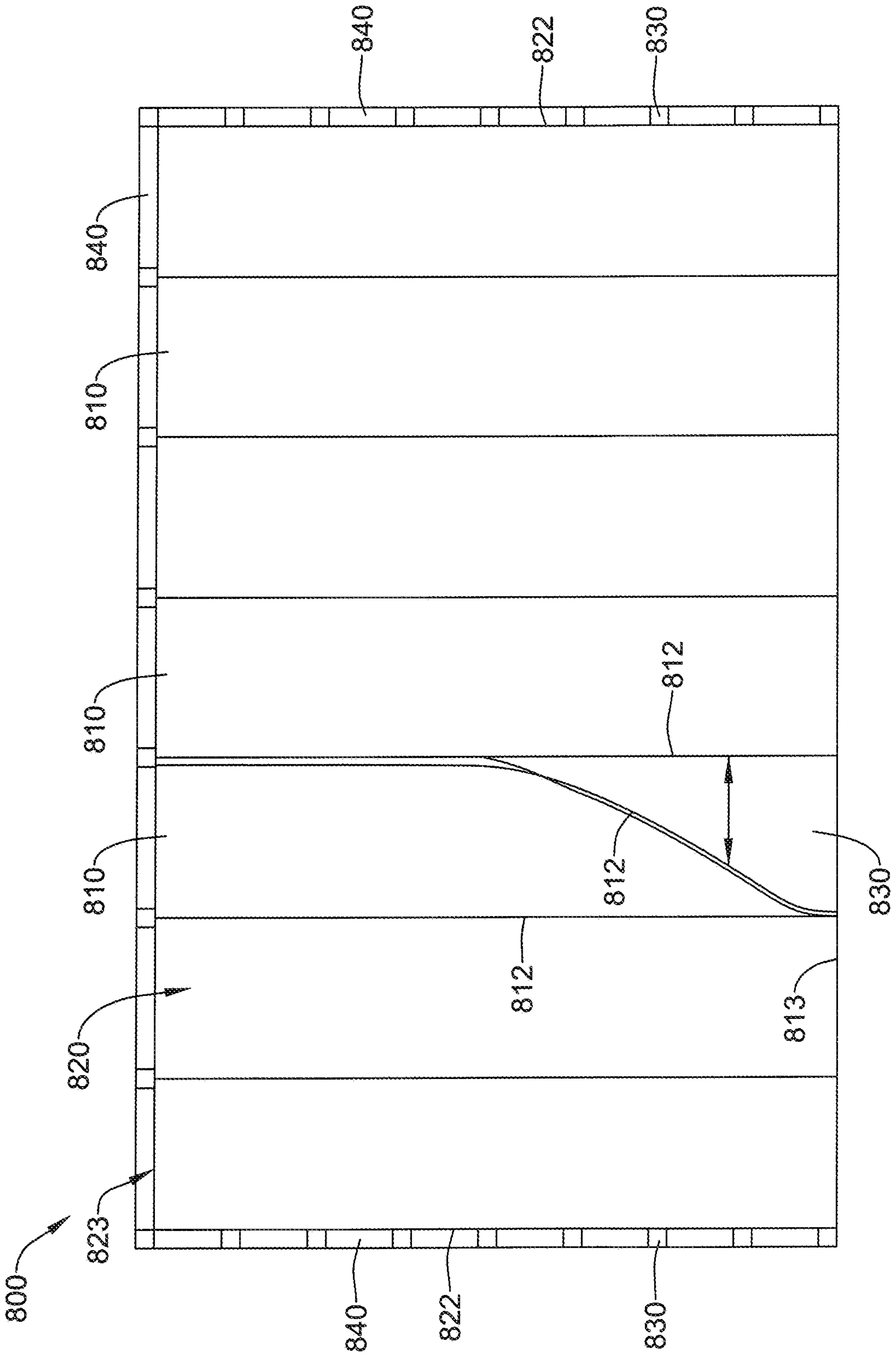
FIG. 8 shows an illustrative fume hood opening including a strip curtain.
Figure 9:
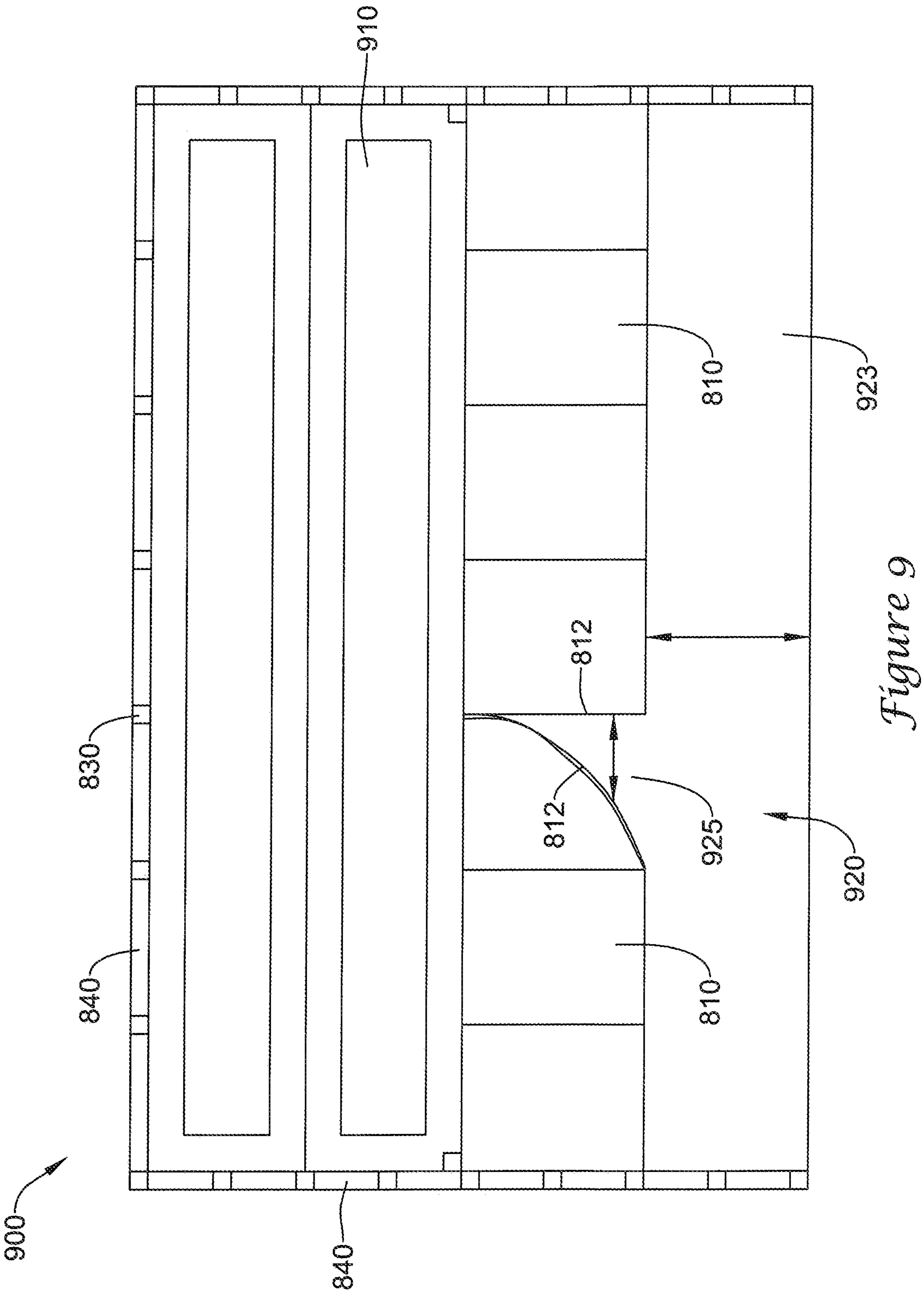
FIG. 9 shows an illustrative fume hood opening including movable sashes and a strip curtain.

In general, many fume hoods, such as the fume hoods 120, 500, 600, 700, have been shown to have openings with a rectangular shape (e.g., the openings 140, 520, 620A-C) and/or one or more rectangular shaped areas (e.g., the opening areas 730-750). However, as shown in FIGS. 8 and 9, a fume hood opening may include one or more openings having a different shape. For example, FIG. 8 shows an illustrative fume hood 800 using one or more strip curtains 810 to cover the fume hood opening 820. In some cases, strip curtains 810 may be fixed at a specified location of the fume hood opening, but this is not required. In one example, the strip curtains 810 may be capable of sliding horizontally and/or vertically in relation to the fume hood opening. In some cases, such as in FIG. 9, one or more sashes, such as the vertically moving sash 910 may be combined with a strip curtain 810 and be used to allow access to the interior space of the fume hood 900. For example, the fume hood opening 920 may include a first area 923 exposed below the combined vertically moving sash 910 and strip curtain 810, a second area 925 exposed by moving one or more strip curtains 810, or both.

Typically, a strip curtain 810 may be used with a floor-mounted (e.g., walk-in) fume hood 800, but this is not required. As can be seen, the strip curtains 810 may be positions to hang parallel to the vertical edges 822 of the fume hood opening 820. An open area 830 of the fume hood opening 820 may be exposed by moving at least a portion of one or more strip curtains 810. To facilitate the identification and/or the area of the open area 830, one or more edges of the fume hood opening 820 may be enhanced for easier detection by one or more sensors 150A, 150B, 430, 440, and 450. For example, the edges 822, 823 of the fume hood opening 820 may be enhanced by using a material (e.g., tape, paint, a coating, a reflector, etc.) that may be reflective over one or more specified spectra (e.g., visible light, IR light, UV light, ultrasonic acoustic energy). In some cases, the material may be configured to absorb one or more specified spectra. For example, a coating may be applied to the vertical edges 812 and/or horizontal edges 813 of the strip curtains, where the coating is at least partially transparent in the visible light spectrum and reflective in the IR spectrum. In some cases, one or more markers and/or indicators 830 and/or scales 840 may be positioned adjacent to the edges 822, 823 of the fume hood opening 820.

Figure 10:
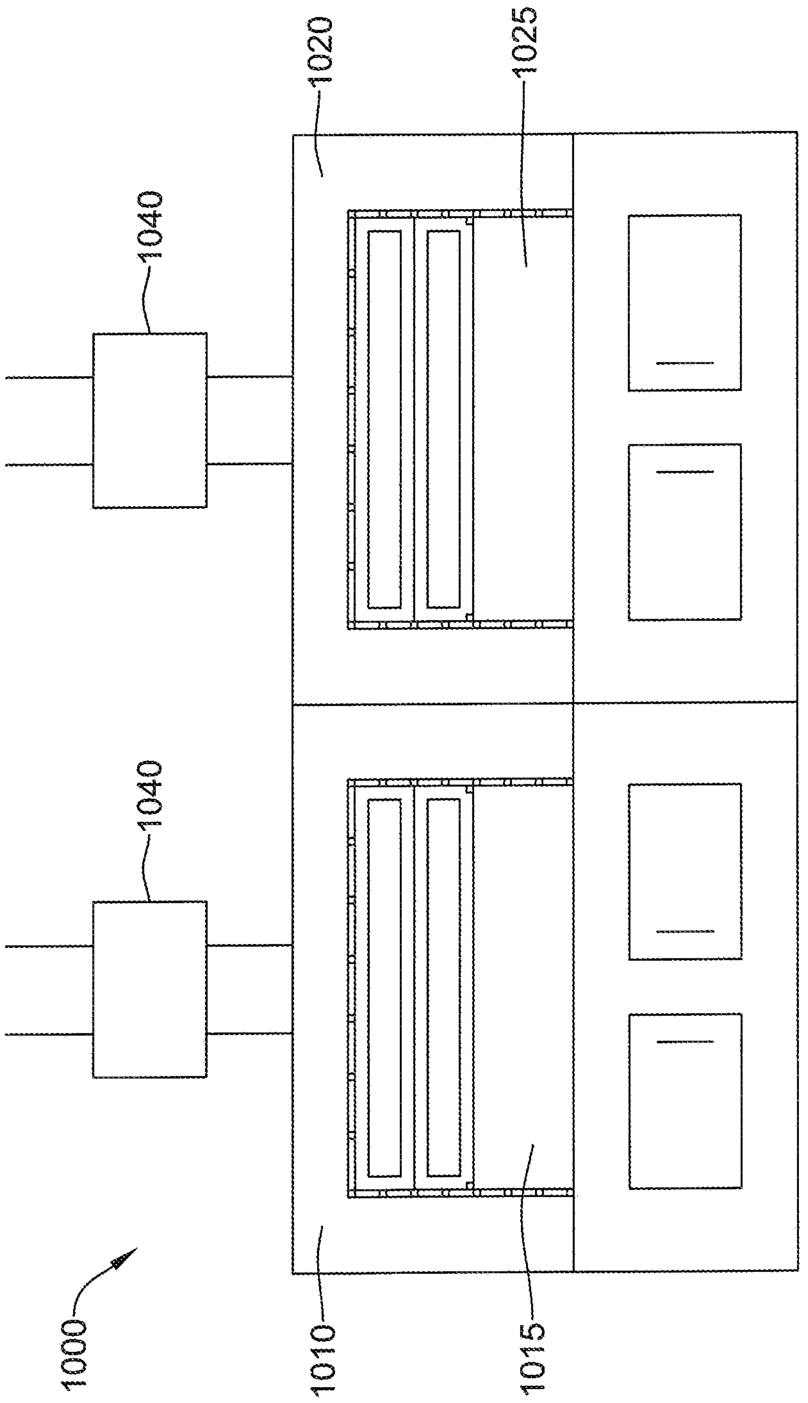
FIG. 10 shows an illustrative fume hood installation.

FIG. 10 shows an illustrative fume hood installation 1000. In some cases, an individual fume hood 1010 may be installed within a room and/or zone of a building. In other cases, two or more fume hoods 1010, 1020 may be installed within the same room and/or zone of the building. Each individual fume hood 1010, 1020 may have a dedicated ventilation device 1040, 1050, but this is not required. For example, the two or more fume hoods may be configured to use a single ventilation device 1040, suitably sized to provide the proper airflow through the openings 1015, 1025. In some cases, a single fume hood 1010 may have two or more fume hood openings 1015, 1025 that open to a common interior space. In some cases, one or more sensor units 430, 440, 450 may be used to obtain an image including at least a portion of the one or more fume hood openings 1015, 1025. In some cases, the one or more sensor units 430, 440, 450 may be positioned to obtain an image of the first fume hood opening 1015 and one or more different sensor units may be positioned to obtain an image of the second fume hood opening 1025. In other cases, one or more sensor units 430, 440, 450 may be positioned to obtain an image including a portion of two or more different fume hood openings, such as the fume hood openings 1015, 1025. For example, a sensor unit 430 may be positioned to obtain an image including at least a portion of a first fume hood opening 1015 and at least a portion of a second fume hood opening 1025. In such cases, the controller 200 may be configured to identify the size and/or shape of the first opening 1015 and/or the second opening 1025 from the same image obtained from the sensor unit 430. In another example, a first sensor unit 430 may be positioned to obtain an image including at least a portion of the first fume hood opening 1015, a second sensor unit may be positioned to obtain an image of at least a portion of the second fume hood opening 1025, and a third sensor unit may be positioned to obtain an image including at least a portion of both the first fume hood opening 1015 and the second fume hood opening.

Figure 11:
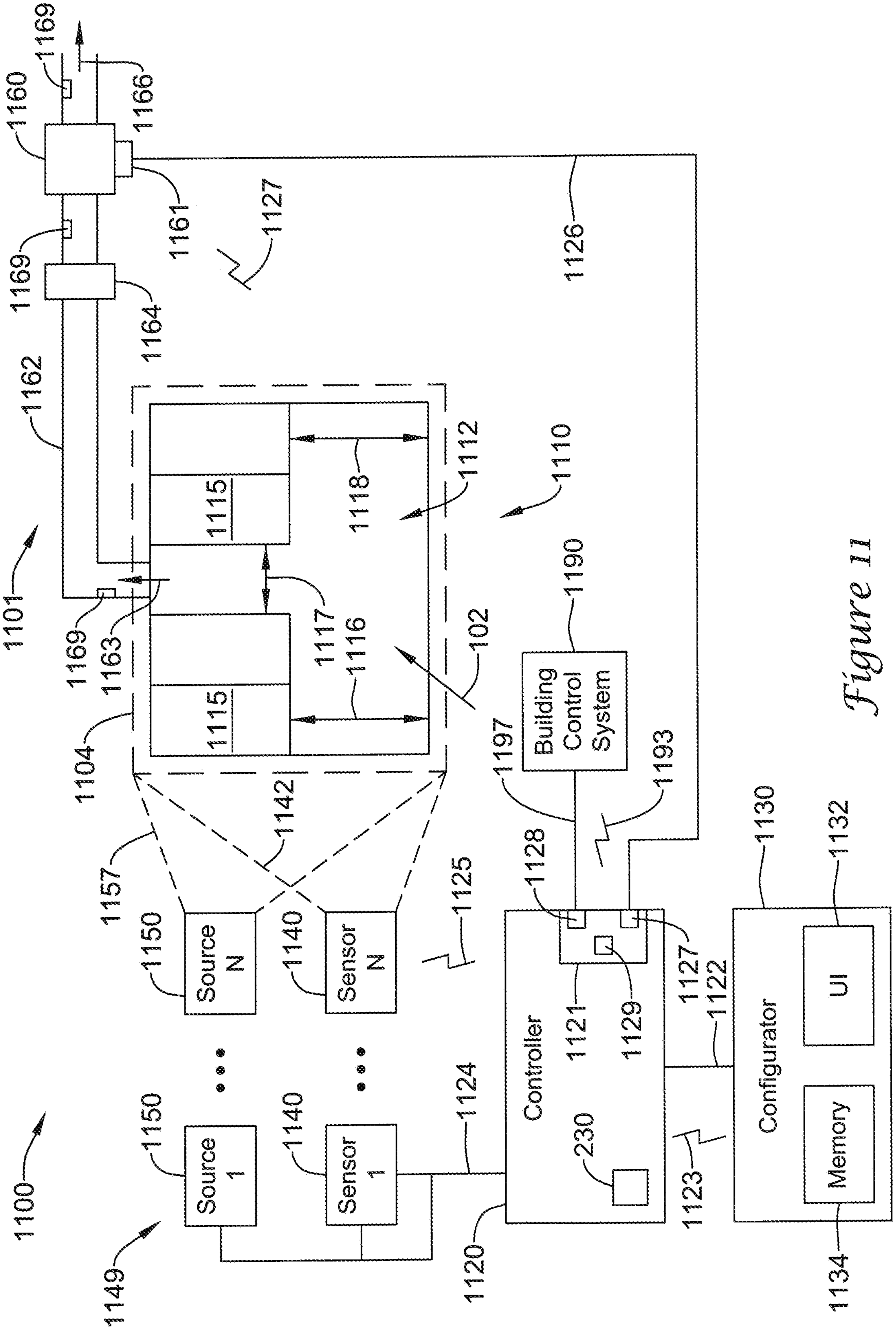
FIG. 11 shows an illustrative fume hood control system for controlling airflow through a fume hood using an image of a fume hood opening.

FIG. 11 shows an illustrative fume hood control system 1100 for controlling airflow 1102 through a fume hood 1110 using an image 1104 of a fume hood opening 1112. In some cases, the fume hood control system 1100 may include a controller 1120 communicatively coupled via a wired and/or wireless communication link 1122, 1123 to a configurator 1130 having a user interface 1132. The controller 1120 may be communicatively coupled via a wired and/or wireless link 1124, 1125 to one or more image sensors 1140 for obtaining an image including at least part of the fume hood opening 1112, and in some cases, one or more light and/or audio sources 1150 capable of illuminating at least a portion of the fume hood 1110. The controller 1120 may include one or more inputs and/or outputs 1121 for exchanging data (e.g., environmental information, airflow information, alarms, commands, etc.) with a building control system 1190 and/or a ventilation device 1160 of the ventilation system 1101.

One or more fume hood 1110 may be installed in a room and/or zone of a building. The configuration of the fume hood 1110 may be determined based on one or more factors that may include cost, available space within the room and/or zone, materials to be used and/or stored, activities to be performed within the hood, applicable codes and/or standards, and the like. For example, the fume hood 1110 may be configured to have an opening 1112, where the geometrical size and/or shape of the opening 1112 may vary based on the physical positioning of the sashes 1115. In the illustrative example of FIG. 11, the fume hood 1110 is shown to include sashes 1115 capable of moving in both the horizontal and vertical directions. The size and/or shape of the opening 1112 may include one or more of the contiguous opening areas 1116, 1117, and 1118 depending on the positioning of the sashes 1115.

As discussed above, the ventilation system 1101 may be configured to include a ventilation device 1160 (e.g., a fan, a blower, etc.) coupled to the fume hood 1110 via ductwork 1162. In some cases, the ventilation system 1101 may include one or more filters and/or scrubbers 1164 based on the materials and/or use of the fume hood 1110, the location of the fume hood 1110, the size and/or shape of the ductwork 1162 and the like. In some cases, the ventilation system may include one or more airflow sensors 1169 capable of producing a signal corresponding to the airflow at one or more points of the ventilation system. For example, the sensors 1169 may be placed to measure the face velocity 1102 of the air entering the fume hood, the airflow 1163 entering the ductwork 1162, the airflow upstream and/or downstream of the filter 1164, and/or the exhaust airflow 1166 at an exhaust of the ventilation system. In some cases, the ventilation device 1160 may include a communication interface 1161 for exchanging data with a controller via a wired and/or wireless link 1126. Such data may include a velocity command to the ventilation device 1160 from the controller and/or feedback information from the ventilation system including information corresponding to the operational status of the ventilation device 1160 (e.g., a current, a velocity, motor feedback signal, etc.), and/or velocity information obtained by the one or more airflow sensors 1169. In some cases, the controller may receive a signal corresponding to the status of the filter and/or scrubber 1164.

In some cases, the one or more sensors 1140 and/or sources 1150 of the fume hood control system 1100 may be included in an imaging system 1149. In one example, the imaging system 1149 may include one or more image sensors (e.g., still cameras, video cameras) positioned to obtain an image (e.g., a visible light image, an IR light image, a UV light image, an acoustic image) of an imaging area 1104 including at least a portion of the fume hood opening 1112. A sensor may be placed so that the imaging area 1104 may include the complete fume hood opening. In other cases, two or more sensors may be necessary to image the full hood opening 1112 based on the field of view 1142 of the two or more sensors.

The sensors 1140 (e.g., the sensors 150A-B, 420, 430, 440) and or light and/or acoustic sources 1150 (e.g., the sources 410, 420) may be positioned within the room and external to the fume hood 1110. Alternatively, or in addition, the sensors 1140 and/or sources 1150 may be positioned within an interior space of the fume hood 1110. In some cases, the image sensor 1140 may be configured to obtain an image using ambient light. When one or more sources 1150 are provided, the image sensors 1140 may be configured to obtain an image using light and/or acoustic energy produced by the sources 1150. In some cases, the sources 1150 and/or sensors 1140 may be capable of exchanging data (e.g., commands, feedback information, image information, etc.) with the controller 1120 via a wired and/or wireless communication link 1124, 1125. In one example, the sensor 1140 may obtain an image of the fume hood opening 1112 and transfer the image information to the controller 1120 in response to a command received from the controller 1120. Likewise, the source 1150 may receive a command from the controller to illuminate at least a portion of the fume hood 1110 from the controller 1120. In some instances, the one or more sensors 1140 may automatically obtain one or more images of the fume hood opening, such as a video image and/or still images taken at predetermined intervals. Also, it is contemplated that the sensor 1140 may obtain an image of the fume hood opening 1112 when the fume hood opening 1112 is illuminated by a corresponding source 1150. For example, the fume hood opening 1112 may be illuminated by one or more of a visible light source, an IR light source, a UV light source, and/or an acoustic energy source.

In some cases, the configurator 1130 (e.g., the configurator 160, 160 of FIG. 1, the configurator 300 of FIG. 3, etc.), when provided, may include a user interface 1132 and/or a memory 1134. The configurator 1130 may be used for configuring and/or viewing one or more parameters and/or settings in the controller, based on the installed fume hood control system 1100. In some cases, a user may select a configuration from one or more configurations stored in the memory 1134 using the user interface 1132. The configurations stored in the memory 1134 may include a configuration of the fume hood 1110, a configuration of the imaging system 1149, a configuration of the ventilation system 1101, a configuration of the room and/or zone of the building (e.g., the number of installed fume hoods), a configuration of the one or more communication links 1122, 1123, 1124, 1125, 1126 (e.g., communication protocol, connection type, etc.) and/or building control system (e.g., alarm system information, etc.), and/or any other suitable configuration information. A user may use the user interface 1132 to select and/or modify a stored configuration stored the memory 1134, enter a new configuration to be stored in the memory 1134 and/or select a configuration to be transferred to one or more controllers 1120 via a wired and/or wireless link 1122, 1123.

In one example, the configuration of the imaging system 1149 may include information about the number, the location, the type, and/or the field of view of the sensors 1140 and/or the sources 1150. The configuration of the fume hood 1110 may include information about one or more of a sash configuration, a maximum opening size, one or more materials to be used within the hood, the one or more applications to be performed in the hood, a minimum face velocity, and the like. The configuration of the ventilation system 1101 may include information about the duct work (e.g., cross sectional area, length of run, etc.), the filter and/or scrubber type, the ventilation device (e.g., motor rating, current rating, feedback type, etc.), the sensors 1169, and the like.

As discussed above with FIG. 2, the controller 1120 (e.g., the controller 200) may include a communication interface 1122, such as the I/O block 250. The communication interface may allow the controller 1120 to communicate to one or more components of the fume hood control system 1100 (e.g., the sensors 1140, the sources 1150, the configurator 1130, the ventilation device 1160, etc.) and/or one or more components of the building control system 1190 (e.g., an alarm system, a building controller, a zone controller, etc.). In some cases, the communication interface may include one or more wire terminals 1127, 1128 for enabling wired communication over one or more wired communication links 1122, 1124, 1126, 1192 and/or one or more antennas 1129 for enabling wireless communication over one or more wireless communication links 1123, 1125, 1127, 1193. In some cases, the controller 1120 may be configured to communicate with the building control system 1190, such as to provide information about the operational status of the fume hood control system 1100. In some cases, the controller 1120 may provide information related to the operational status of the ventilation device 1160 (e.g., motor velocity, air velocity, peak and/or steady-state current, etc.), the status of the filter and/or scrubber (e.g., filter replacement, etc.), and/or other information to the one or more components of the building control system. In some cases, the information may be associated with an alarm condition, such as a low velocity condition and cause the building control system to log the error and/or provide additional airflow to the room and/or zone of the building.

Figure 12:
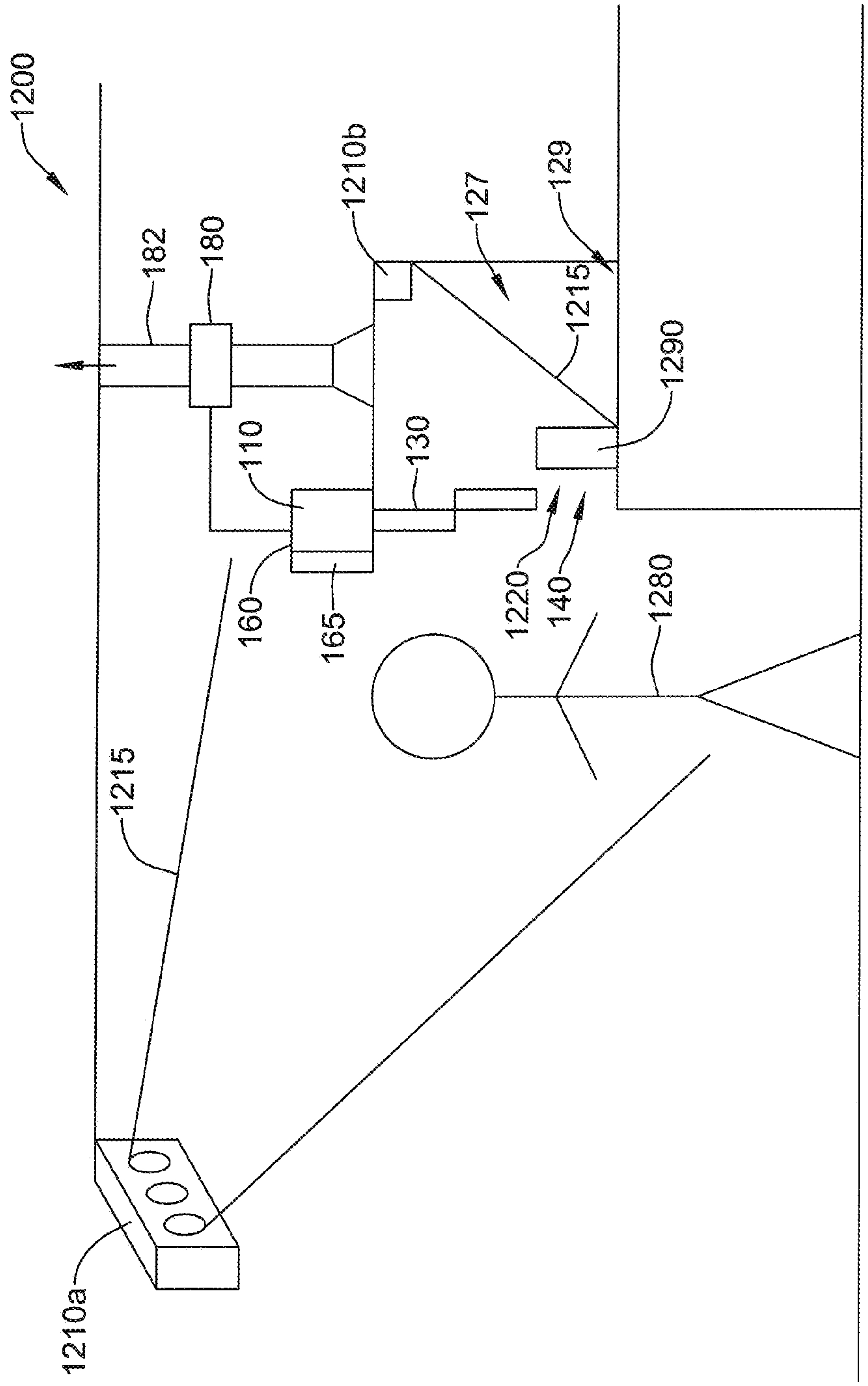
FIG. 12 shows a cross-sectional block diagram representation of the fume hood control system of FIGS. 1 and 11.

FIG. 12 shows a cross-sectional block diagram representation of the fume hood control system of FIGS. 1 and 11. In some cases, the fume hood control system 1200 may be installed in a room and/or zone of a building. The fume hood control system 1200 may include one or more image sensor unit 1210A, 1210B positioned such that the field of view 1215 of the image sensors 1210A, 1210B includes at least a portion of the fume hood opening 140. A controller 110 may use one or more images obtained by the one or more image sensors 1210A, 1210B to control the face velocity of airflow 1220 drawn through the opening 140. As discussed above, the controller 110 may use configuration information received from the configurator 160 and/or the user interface 165 to analyze and/or process one or more images received from the image sensors 1210A, 1210B. In some cases, one or more obstacles (e.g., a person 1280, an object 1290) may be within the field of view of the one or more image sensors 1210A, 1210B. For example, the person 1280 and/or object 1290 may block the view of at least a portion of the fume hood opening 140. In such cases, the controller 110 may determine the size and/or shape of the opening 140 using an algorithm and/or instructions to identify at least one edge of the fume hood opening.

In some cases, the controller 110 may use the image obtained from the one or more sensors 1210A, 1210B to determine occupancy information about the room and/or zone where the fume hood 120 is installed. For example, the controller 110 may be capable of determining whether the zone and/or room within the building is occupied using the image obtained from the sensors 1210A, 1210B. For example, the controller 110 determine that the room is occupied by identifying a person within the field of view of the sensors 1210A, 1210B and/or by determining whether the lights in the room and/or zone are on or off. In some cases, the occupancy information may include information about the activity of an identified person 1280 within the zone. Such activity information may include information about whether the person 1280 is moving by the fume hood 120 or working at or near the fume hood opening (e.g., within a specified distance from the fume hood opening 140). In such cases, the controller 110 may use the occupancy information to generate a command to the ventilation device 180 and/or communicate the occupancy information to a building control system (e.g., a building controller, a zone controller, an HVAC controller, a security system, etc.) via a wired and/or wireless link. For example, the controller 110 may reduce the velocity command to the ventilation device 180, when the room and/or zone is determined to be unoccupied and/or when the sashes 130 of the fume hood 120 are identified as being closed.

In some cases, the controller 110 may use the occupancy information and/or other information obtained from the image to issue an alarm and/or to generate an automated response. In some cases, an alarm may be generated when the controller 110 identifies that the room is unoccupied but the sashes 130 of the fume hood 120 remain at least partially open. Such alarms may be issued locally through an associated user interface or other audio and/or visual indicators (e.g., an audible alarm, a flashing light, etc.) In some cases, the alarms and/or warnings may be communicated to a building control system (e.g., a building controller, a zone controller, an HVAC controller, a security system, etc.). Some alarms may also cause the controller 110 to issue a command to the ventilation device 160. For example, the controller 110 may be configured to increase the velocity command sent to the ventilation device during an alarm condition.

Figure 13:
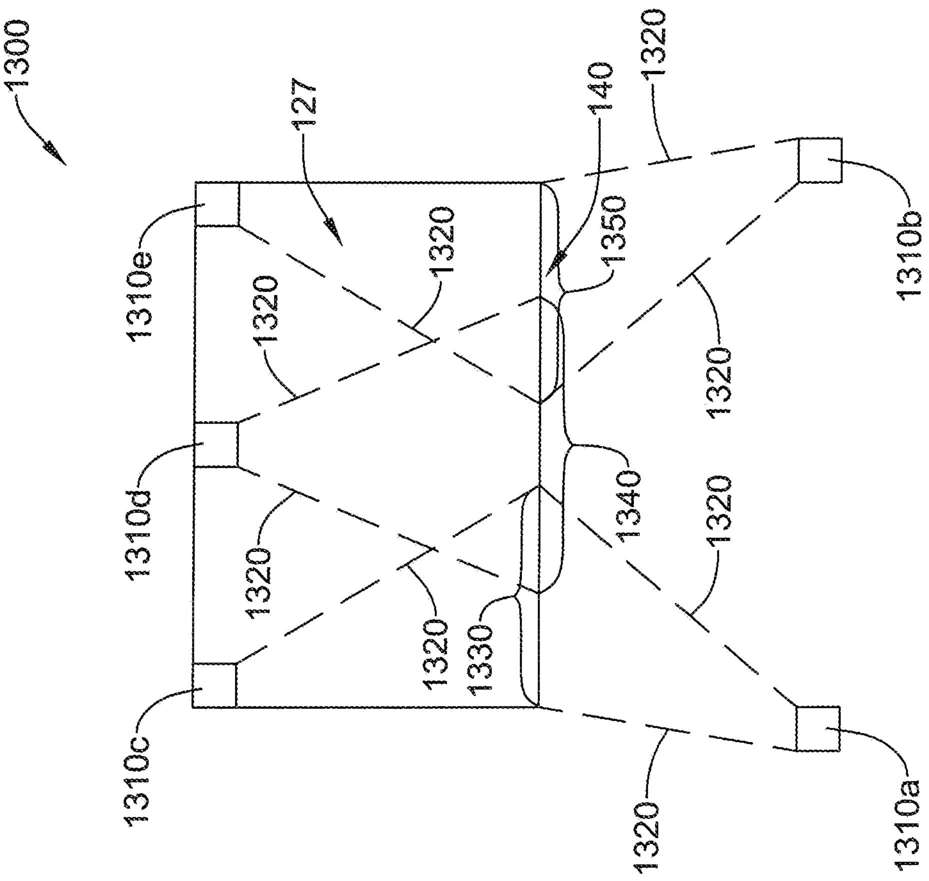
FIG. 13 shows an illustrative arrangement of image sensors for obtaining an image of a fume hood opening.

Some alarms may be generated after the controller 110 identifies an unsafe work practice of the person 1280 and/or an unsafe operating condition of the fume hood 120. For example, the controller 110 may use the image to identify an unsafe work practice performed by the person 1280, such as removing dangerous substances from the interior of the fume hood 120, improper use and/or storage of materials, improper use and/or storage of equipment, and/or other unsafe work practices (e.g., working with the person's head positioned within the interior of the fume hood 120). The controller 110 may identify an object 1290 near the fume hood opening 140 that may not be fully contained within the interior of the fume hood 120 and/or may interfere with the proper operation of the sashes 130. In some cases, the controller 110 may be capable of identifying whether smoke and/or other substances are escaping into the room and/or zone the containment of the fume hood 120 via the fume hood opening 140. FIG. 13 shows an illustrative arrangement 1300 of image sensors 1310A-E for obtaining an image of a fume hood opening 140. As discussed above, one or more images sensors 1310A-E may be positioned to obtain an image of at least part of the fume hood opening 140. In some cases, such as in FIGS. 1, 4, 12, the one or more images sensors may be positioned such that the field of view 1320 may be capable of capturing an image of the entire fume hood opening 140. In other cases, two or more image sensors 1310A-E may be positioned such that each image sensor 1310A-E may each capture an image of a portion (e.g., portions 1330-1350) of the fume hood opening 1310. A controller, such as controller 200, may receive the images of the portions 1330-1350 of the fume hood opening and process the images using one or more instructions and/or algorithms stored in the memory 230 to obtain image information about the entire fume hood opening 140. In some cases, two or more of the images obtained from the individual sensors 1310A-E may be used to form a composite image of the fume hood opening 140 by the controller 200. In some cases, controller may process and/or analyze the composite image, the one or more of the individual images, or both the composite and the individual images to determine the geometrical size and/or shape of the fume hood opening.

Figure 14:
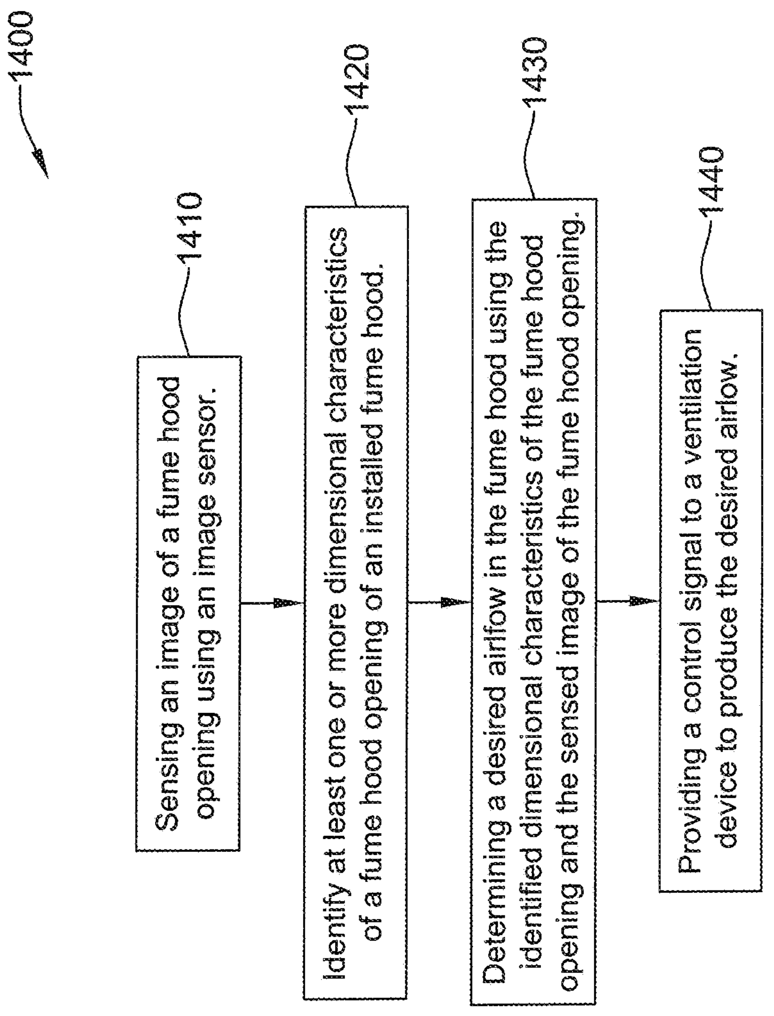
FIG. 14 shows an illustrative technique of controlling airflow through a fume hood using an image of the fume hood opening.

FIG. 14 shows an illustrative method 1400 of controlling airflow through a fume hood, such as the fume hood 120 of FIG. 1 using an image of the fume hood opening 140. In some cases, the method may start at 1410 by capturing an image of the fume hood opening using an image sensor. One or more images of at least part of the fume hood opening 140 may be obtained from one or more image sensors (e.g., the images sensors 150A, 150B of FIG. 1, the image sensors 430-450 of FIGS. 4A and 4B). In some cases, the image sensors 150A, 150B, 430-450 may be configured to obtain one or more optical images (e.g., a visible light image, a IR light image, a UV light image, a combination two or more visible light images, IR light images and/or UV light images), one or more acoustic images, or a combination of optical and/or acoustic images, as desired.

At 1420, at least one or more dimensional characteristics of a fume hood opening of an installed fume hood may be identified. For example, a controller may receive the one or more images from the image sensors 150A, 150B via a wired and/or wireless connection. The images may then be analyzed by the controller 110 to determine one or more dimensional and/or geometrical characteristics of the fume hood opening 140. For example, the controller 110 may process one or more instructions (e.g., an edge detection algorithm) to identify one or more features associated with at least one edge of the fume hood opening 140 and determine one or more dimensional and/or geometrical characteristics using the identified features.

At 1430, the controller may process and/or analyze the images using a configuration including information about one or more components of the fume hood control system to determine a desired airflow. The desired airflow at the ventilation device 180 may be different than the desired face velocity at the fume hood opening due to one or more characteristics of the ventilation system (e.g., filter type, scrubber type, distance of ductwork, etc.). In some cases, the fume hood control system may include a configurator 160 to provide calibration information to the controller 110. For example, the calibrator may provide information about the type of sashes, maximum dimensions for the fume hood opening 140, a ventilator type, a type of filter and/or scrubber, the location and/or position of the image sensors, the image sensor type, and the like. At 1440, the controller may provide a control signal to a ventilation device 180 associated with the fume hood 120 to produce the desired airflow at the opening 140 of the fume hood.

Figure 15:
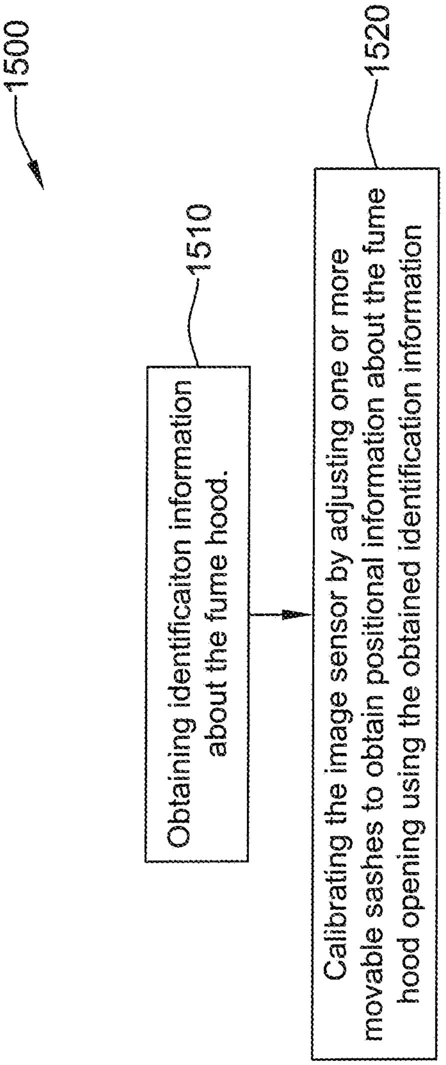
FIG. 15 shows an illustrative technique of calibrating the fume hood control system using an image of the fume hood opening.

FIG. 15 shows an illustrative technique 1500 of calibrating the fume hood control system 100, 1100 of FIGS. 1 and 11 using an image of the fume hood opening 140. At 1510, the controller 110 may obtain identification information about the fume hood from the configurator 160. In some cases, the configurator includes a memory 330 having identification information about one or more fume hoods, sensor types, ventilation system components and/or standard configurations of fume hood control systems stored within the memory 330. A user may enter identification information about the one or more components of the fume hood control system 100 via the user interface 165 of the configurator 160. In some cases, the identification information entered and/or selected by a user via the user interface 165 may be stored in the memory 330 for use in one or more other configurations.

At 1520, the calibration information may be used in calibrating the one or more image sensor 150A, 150B, 430-450 by adjusting one or more movable sashes 130 to obtain positional information about the fume hood opening 140 using the obtained identification information. For example, the maximum size and/or shape of the fume hood opening 140 may be based on the fume hood model and/or the one or more sashes 130 installed with the fume hood 120. Additionally, the image sensors may be located in a known position (e.g., at a top corner of the interior space of the fume hood), or may be placed in a location based on the available space surrounding adjacent to the fume hood 120. As such, it may be desirable for the controller 110 and/or configurator 160 to obtain calibration information to identify dimensional and/or geometric information about the fume hood opening 140.

Having thus described several illustrative embodiments of the present disclosure, those of skill in the art will readily appreciate that yet other embodiments may be made and used within the scope of the claims hereto attached.

What is claimed is:

1. A system for controlling a fume hood comprising:

a first camera configured to provide images from a first vantage point, the first camera having a field of view that includes at least part of a fume hood opening;

a second camera configured to provide images from a second vantage point that is different from the first vantage point, the second camera having a field of view that includes at least part of a fume hood opening;

a controller operatively coupled to the first camera and the second camera, the controller is configured to:

determine when at least part of the field of view of the first camera that includes at least part of the fume hood opening is at least partially blocked by an intervening object and at least part of the field of view of the second camera captures at least part of the fume hood opening that is at least partially blocked by the intervening object in the field of view of the first camera, and when so, determine one or more characteristics of the fume hood opening based at least part on the field of view of the second camera that captures at least part of the fume hood opening that is at least partially blocked by the intervening object in the field of view of the first camera, wherein determining the one or more characteristics of the fume hood opening includes operating an edge detection algorithm to detect one or more edges of the fume hood opening in at least part of one of the images of the second camera that captures at least part of the fume hood opening that is at least partially blocked by the intervening object in the field of view of the first camera; and provide a control signal to a ventilation device to produce a desired airflow in the fume hood based at least in part upon the determined one or more characteristics of the fume hood opening.

2. The system of claim 1, wherein the desired airflow is determined as in airflow per unit of area of the fume hood opening.

3. The system of claim 1, wherein the first camera comprises an infrared light camera for providing infrared light images.

4. The system of claim 1, wherein the first camera comprises a visible light camera for providing visible light images.

5. The system of claim 1, wherein the first camera comprises an infrared light camera for providing infrared light images and the second camera comprises a visible light camera for providing visible light images.

6. The system of claim 1, wherein a size of the fume hood opening is defined, at least in part, based on a current position of one or more movable sash of the fume hood.

7. The system of claim 1, wherein the first camera is located within the fume hood.

8. The system of claim 1, wherein the first camera is located outside of the fume hood.

9. The system of claim 1, wherein the one or more characteristics of the fume hood opening comprise a measure related to a size of the fume hood opening, and wherein the controller is configured to calculate the desired airflow based at least in part on the measure related to the size of the fume hood opening.

10. A method of controlling a fume hood, the method comprising:

obtaining a first image from a first camera having a first vantage point, the first camera having a field of view that includes at least part of a fume hood opening;

obtaining a second image from a second camera having a second vantage point that is different from the first vantage point, the second camera having a field of view that includes at least part of the fume hood opening;

determining when at least part of the field of view of the first camera that includes at least part of the fume hood opening is at least partially blocked by an intervening object and at least part of the field of view of the second camera captures at least part of the fume hood opening that is at least partially blocked by the intervening object in the field of view of the first camera, and when so determined, determining one or more characteristics of the fume hood opening based at least part on the field of view of the second camera that captures at least part of the fume hood opening that is at least partially blocked by the intervening object in the field of view of the first camera, wherein determining the one or more characteristics of the fume hood opening includes operating an edge detection algorithm to detect one or more edges of the fume hood opening in at least part of one of the images of the second camera that captures at least part of the fume hood opening that is at least partially blocked by the intervening object in the field of view of the first camera; and providing a control signal to a ventilation device to produce a desired airflow in the fume hood, the control signal being based at least in part upon the determined one or more characteristics of the fume hood opening.

11. The method of claim 10, wherein the desired airflow is determined as in airflow per unit of area of the fume hood opening.

12. The method of claim 10, wherein the first camera comprises an infrared light camera for providing infrared light images.

13. The method of claim 10, wherein the first camera comprises a visible light camera for providing visible light images.

14. The method of claim 10, wherein the first camera comprises an infrared light camera for providing infrared light images and the second camera comprises a visible light camera for providing visible light images.

15. The method of claim 10, wherein a size of the fume hood opening is defined, at least in part, based on a current position of one or more movable sash of the fume hood.

16. The method of claim 10, wherein the first camera is located within the fume hood.

17. The method of claim 10, wherein the first camera is located outside of the fume hood.

18. The method of claim 10, wherein the one or more characteristics of the fume hood opening comprise a measure related to a size of the fume hood opening, the method further comprising calculating the desired airflow based at least in part on the measure related to the size of the fume hood opening.

19. A method of controlling a fume hood, the method comprising:

obtaining a plurality of images from a plurality of image sensors, each of the plurality of images having a different vantage point and each having a field of view that includes at least part of a fume hood opening, wherein:

when a first one of the plurality of images has at least part of the field of view of the fume hood opening at least partially blocked by an intervening object, and a second one of the plurality of images captures at least part of the fume hood opening that is at least partially blocked by the intervening object in the first one of the plurality of images, determining a first control signal for a ventilation device associated with the fume hood to produce a desired airflow in the fume hood, wherein the first control signal is based at least in part upon the second one of the plurality of images that captures at least part of the fume hood opening that is at least partially blocked by the intervening object in the first one of the plurality of images, and providing the first control signal to control the ventilation device; and when the second one of the plurality of images has at least part of the field of view of the fume hood opening at least partially blocked by an intervening object, and the first one of the plurality of images captures at least part of the fume hood opening that is at least partially blocked by the intervening object in the second one of the plurality of images, determining a second control signal for the ventilation device associated with the fume hood to produce a desired airflow in the fume hood, wherein the second control signal is based at least in part upon the first one of the plurality of images that captures at least part of the fume hood opening that is at least partially blocked by the intervening object in the second one of the plurality of images, and providing the second control signal to control the ventilation device.

20. The method of claim 19, wherein the plurality of image sensors comprises an infrared light sensor for providing infrared light images and a visible light sensor for providing visible light images.

* * * * *